(12) United States Patent
Wang et al.

(10) Patent No.: US 9,754,045 B2
(45) Date of Patent: Sep. 5, 2017

(54) SYSTEM AND METHOD FOR WEB TEXT CONTENT AGGREGATION AND PRESENTATION

(75) Inventors: Charles Chuanming Wang, Philadelphia, PA (US); Yong Ling, Shanghai (CN)

(73) Assignee: Harman International (China) Holdings Co., LTD., Shanghai (CN)

(*) Notice: Subject to any disclaimer, the term of this patent is extended or adjusted under 35 U.S.C. 154(b) by 706 days.

(21) Appl. No.: 13/310,615

(22) Filed: Dec. 2, 2011

(65) Prior Publication Data

US 2012/0253814 A1   Oct. 4, 2012

(51) Int. Cl.
 *G10L 13/00* (2006.01)
 *G10L 13/08* (2013.01)
 *G06F 17/30* (2006.01)
 G10L 13/02 (2013.01)

(52) U.S. Cl.
 CPC ........ *G06F 17/30905* (2013.01); *G10L 13/02* (2013.01)

(58) Field of Classification Search
 USPC .................................. 704/258, 260
 See application file for complete search history.

(56) References Cited

U.S. PATENT DOCUMENTS

| | | | | |
|---|---|---|---|---|
| 7,325,192 B1* | 1/2008 | Bialek | .................. | G06F 17/3089 707/E17.116 |
| 7,346,649 B1* | 3/2008 | Wong | ............................ | 709/203 |
| 7,496,840 B2* | 2/2009 | Hailey | .................... | G06Q 10/10 715/243 |
| 7,502,995 B2* | 3/2009 | Takagi | .............. | G06F 17/30905 707/999.003 |
| 7,966,184 B2* | 6/2011 | O'Conor | ........... | G06F 17/30899 704/260 |
| 8,595,186 B1* | 11/2013 | Mandyam et al. | ........... | 707/632 |
| 9,432,516 B1* | 8/2016 | Barbulescu | ............ | H04H 20/82 |
| 2001/0051961 A1* | 12/2001 | Duxbury | .................. | G06F 17/24 715/243 |
| 2002/0032359 A1* | 3/2002 | Geoffrion et al. | ................ | 600/3 |
| 2002/0032569 A1* | 3/2002 | Lipe et al. | ..................... | 704/270 |
| 2002/0078134 A1* | 6/2002 | Stone et al. | ................... | 709/202 |
| 2002/0129024 A1* | 9/2002 | Lee | ................................. | 707/10 |
| 2002/0133569 A1* | 9/2002 | Huang | .............. | G06F 17/30905 709/219 |
| 2002/0152245 A1* | 10/2002 | McCaskey | .......... | G06F 17/3089 715/234 |
| 2005/0027676 A1* | 2/2005 | Eichstaedt | .............. | G06F 9/542 |
| 2006/0100984 A1 | 5/2006 | Fogg et al. | | |

(Continued)

OTHER PUBLICATIONS

International Bureau of WIPO, International Preliminary Report on Patentability of PCT/US2012/031641, Switzerland, Oct. 10, 2013, 6 pages.

(Continued)

*Primary Examiner* — Olujimi Adesanya
(74) *Attorney, Agent, or Firm* — McCoy Russell LLP

(57) ABSTRACT

A system and method for aggregating text-based content and presenting the text-based content as spoken audio is described herein, where a server module retrieves and aggregates web content from web content providers that may include text-based web content that is then extracted, filtered and categorizes for a client module to retrieve and play as spoken audio.

50 Claims, 14 Drawing Sheets

(56) References Cited

U.S. PATENT DOCUMENTS

| | | | |
|---|---|---|---|
| 2006/0123053 A1* | 6/2006 | Scannell, Jr. | 707/104.1 |
| 2007/0074105 A1* | 3/2007 | McVeigh | G06F 17/3089 |
| | | | 715/205 |
| 2007/0078993 A1* | 4/2007 | Issa | H04N 7/17318 |
| | | | 709/229 |
| 2007/0083468 A1* | 4/2007 | Wetherell | G06F 17/3089 |
| | | | 705/51 |
| 2007/0100836 A1* | 5/2007 | Eichstaedt et al. | 707/10 |
| 2007/0124285 A1* | 5/2007 | Wright | G06F 17/30489 |
| 2007/0150806 A1* | 6/2007 | Hartmann | G06F 17/2247 |
| | | | 715/235 |
| 2007/0214485 A1 | 9/2007 | Bodin et al. | |
| 2007/0233831 A1* | 10/2007 | Tremblay et al. | 709/223 |
| 2008/0039010 A1* | 2/2008 | Vance et al. | 455/3.06 |
| 2008/0133647 A1* | 6/2008 | Hamzeh | 709/202 |
| 2008/0178122 A1* | 7/2008 | Besecker | G06F 17/3089 |
| | | | 715/854 |
| 2008/0288477 A1* | 11/2008 | Kim | G06F 17/30905 |
| 2009/0005087 A1* | 1/2009 | Lunati | H04L 67/2823 |
| | | | 455/466 |
| 2009/0006523 A1* | 1/2009 | Kordun | G06F 17/3089 |
| | | | 709/202 |
| 2009/0037279 A1* | 2/2009 | Chockalingam | G06Q 30/02 |
| | | | 705/14.1 |
| 2009/0164473 A1* | 6/2009 | Bauer | 707/10 |
| 2009/0187577 A1* | 7/2009 | Reznik | G06F 17/30761 |
| 2009/0204402 A1* | 8/2009 | Marwaha | G06Q 10/10 |
| | | | 704/260 |
| 2009/0249192 A1* | 10/2009 | Chan | G06F 17/30554 |
| | | | 715/235 |
| 2009/0254345 A1* | 10/2009 | Fleizach | G10L 13/043 |
| | | | 704/260 |
| 2009/0271202 A1* | 10/2009 | Takatsuka | 704/260 |
| 2009/0271778 A1* | 10/2009 | Mandyam et al. | 717/171 |
| 2010/0064233 A1* | 3/2010 | Dewar | G06Q 30/02 |
| | | | 715/760 |
| 2010/0115123 A1* | 5/2010 | Airamo | 709/234 |
| 2010/0241963 A1* | 9/2010 | Kulis | G06F 3/167 |
| | | | 715/727 |
| 2010/0257440 A1* | 10/2010 | Kshirsagar | G06F 17/30896 |
| | | | 715/230 |
| 2011/0055687 A1* | 3/2011 | Bhandar | G06F 17/211 |
| | | | 715/235 |
| 2011/0161085 A1* | 6/2011 | Boda et al. | 704/260 |
| 2012/0023126 A1* | 1/2012 | Jin | G06F 17/3082 |
| | | | 707/769 |
| 2012/0079004 A1* | 3/2012 | Herman | H04L 67/26 |
| | | | 709/203 |
| 2012/0158527 A1* | 6/2012 | Cannelongo | G06Q 30/02 |
| | | | 705/14.73 |
| 2012/0159430 A1* | 6/2012 | Waldbaum | G06F 9/4448 |
| | | | 717/106 |

OTHER PUBLICATIONS

International Search Report and Written Opinion, dated Jul. 20, 2012, pp. 1-8, International Application No. PCT/US2012/031641, European Patent Office, The Netherlands.

* cited by examiner

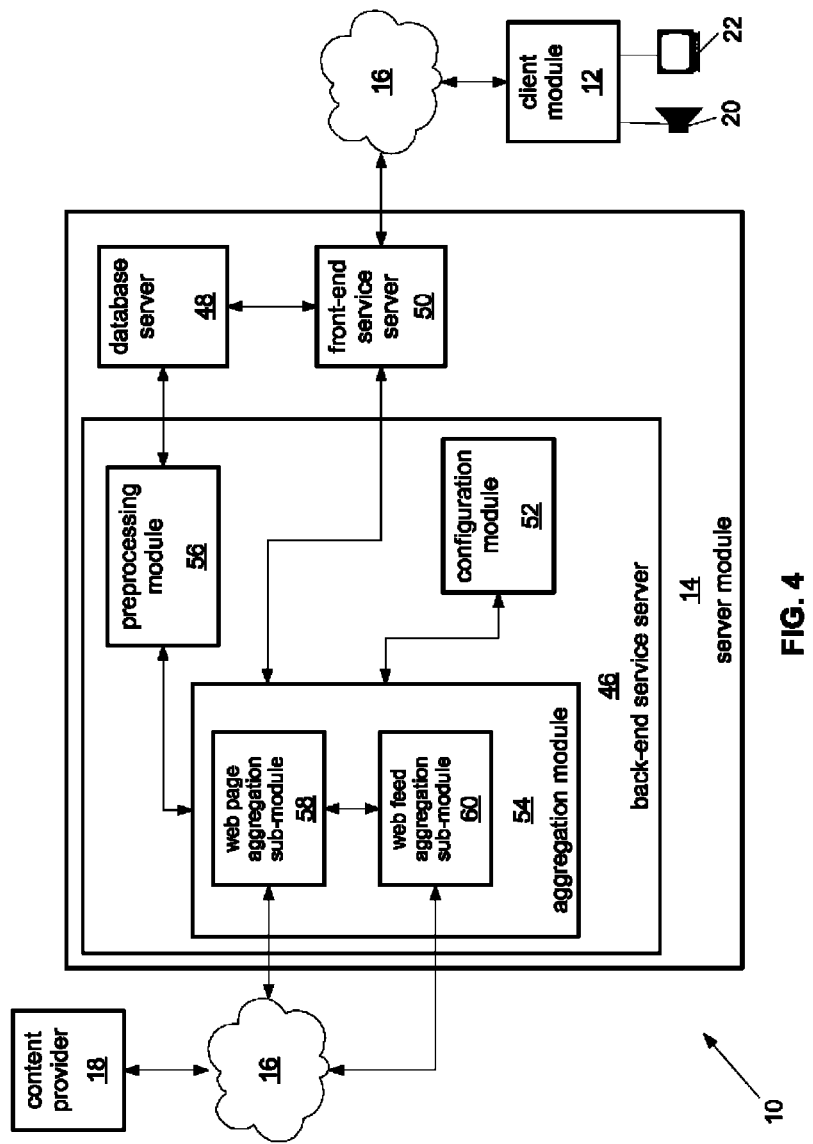

```
<!DOCTYPE HTML PUBLIC "-//W3C//DTD HTML 4.01 Transitional//EN"
"http://www.w3.org/TR/html4/loose.dtd"><html lang="en"><head><script type="text/javascript"
src="http://i.cdn.turner.com/cnn/.element/js/2.0/frame.js"></script>        <script
type="text/javascript">
<title>Amazon Cloud Player lets you play your music from anywhere - CNN.com<title>
    cnnad_newTileIDGroup(new Array ('728x90_top', '336x850_rgt'));
</script>      <meta name="TITLE" content="Amazon Cloud Player lets you play your music from
anywhere - CNN.com">meta property="og:title" content ="Amazon Cloud Player lets you play
your music from anywhere " /> <meta name="description" content="Amazon has just entered the
streaming music business with the launch of Cloud Player, a music player that lets anyone
upload their music to Amazon's servers and play them via the web or Android."><meta
name="KEYWORDS" content=""><meta name="AUTHOR" content="By Ben Parr, Mashable"><meta
name="SECTION" content="TECH"><meta name="SUBSECTION" content="web"><script
type="text/javascript">var cnnisIntl = (location.hostname.indexOf('edition.') > -1) ? true :
false;var clickID = (cnnIsIntl) ? 212106 : 211911;var cnnShareTitle =
encodeURIComponent("Amazon Cloud Player lets you play your music from anywhere");var
cnnShareDesc = encodeURIComponent("Amazon has just entered the streaming music business with
the launch of Cloud Player, a music player that lets anyone upload their music to Amazon's
servers and play them via the web or Android.");var disqus_category_id = 207579;var
disqus_identifier = "/2011/TECH/web/03/29/amazon.cloud.mashable/index.html";var disqus_title
= "Amazon Cloud Player lets you play your music from anywhere "; var cnnFirstPub = new
Date('Tuesday Mar 29 07:55:42 EDT 2011');</script><link rel="canonical"
href="http://www.cnn.com/2011/TECH/web/03/29/amazon.cloud.mashable/index.html" />  <meta
property="fb:admins" content="690014395"/>
<meta property="fb:app_id" content="8040131248 9"/>
<link rel="search" type="application/opensearchdescription+xml"
href="/tools/search/cnncomvideo.xml" title="CNN.com Video" />
<script type="text/javascript"
src="http://z.cdn.turner.com/cnn/.element/js/3.0/protoaculous.1.8.2.min.js"></script>
```

```xml
<?xml version="1.0" encoding="utf-8"?>
<result>
<title>AMD announces support for MeeGo (basis of GENIVI OS)</title>
<pub_date>2010-11-16 05:32:48</pub_date>
<plain>
At the MeeGo Conference 2010, AMD has announced that it has joined The Linux Foundatio
And it will provide engineering expertise intended to help establish the technical fou
The MeeGo Linux-based open-source operating system is primarily designed for mobile ha
The MeeGo project is hosted by The Linux Foundation, a non-profit consortium dedicated
Source: AMD.
Related articles:
MeeGo V1.0 for In-Vehicle Infotainment released.
GENIVI Alliance chooses MeeGo for next-gen infotainment platforms.</plain>
<content><p></p>
<p>At the MeeGo Conference 2010, AMD has announced that it has joined The Linux Founda
<p>And it will provide engineering expertise intended to help establish the technical
<p>The MeeGo Linux-based open-source operating system is primarily designed for mobile
<p>The MeeGo project is hosted by The Linux Foundation, a non-profit consortium dedica
<p>Source: AMD.</p>
<p>Related articles:</p>
<p>MeeGo V1.0 for In-Vehicle Infotainment released.</p>
<p>GENIVI Alliance chooses MeeGo for next-gen infotainment platforms.</p></content>
<website>www.cnbc.com</website>
</result>
```

FIG. 8

SYSTEM AND METHOD FOR WEB TEXT CONTENT AGGREGATION AND PRESENTATION

CROSS-REFERENCE TO RELATED APPLICATION

This application the claims priority of U.S. Provisional Patent Application No. 61/470,865 titled SYSTEM AND METHOD FOR WEB TEXT CONTENT AGGREGATION AND PRESENTATION, filed on Apr. 1, 2011, which is incorporated by reference in its entirety in this application.

FIELD OF THE INVENTION

This invention relates to providing web content in an audio-format to a user and, in particular, relates to aggregating text-based web content and presenting the text-based web content as spoken audio.

BACKGROUND

Web-based content is often accessed using a web browser at a client terminal. A user supplies the web browser with a uniform resource locator (URL) address, and the web browser generates a request with the supplied URL address. The client then transmits the request to a web server over a network such as, for example, the Internet. In response to receipt of the request, the web server retrieves the file associated with the URL and transmits the file and any associated files to the client. The client downloads the file included in the response, and the web browser at the client interprets and presents the file to the user.

Web pages are one kind of file that a user at a client may request using a web browser. Web pages are often formatted using HyperText Markup Language (HTML). Web browsers interpret the HTML in order to present the content of the web pages to users on a display at the client terminal. As the Internet has grown, web pages have been adapted to include not only text- and image-based content, but audio and video content as well. Additionally, the types of devices capable of displaying web-based content have expanded. For example, devices that may be adapted for web browsing include desktop computers, laptop computers, tablet computers, cellular telephones, vehicle infotainment devices, televisions, set-top boxes, and video game consoles.

However, circumstances may constrain the availability or quality of certain web content. Environmental constraints may limit the ability of users to request and view web content on a display (e.g., while driving a car or while on foot). Additionally, some client devices (e.g., cellular telephones) may lack suitable web browsers, input/output (I/O) peripheries, or processing power to retrieve and display certain web content. Moreover, the amount of bandwidth available on a transmission network may limit the availability, download speed, or quality of image-, audio-, or video-based web content, which may use a relatively high amount of bandwidth.

As a result of these constraints, users may prefer to receive the text-based content of web pages and other web documents, which uses a relatively low amount of bandwidth. Furthermore, users may also prefer that the text-based content is presented in an audible format in circumstances when visual presentation of the web content is unavailable, undesired, or unsafe. Moreover, in some circumstances, users may prefer to retrieve the text content in audible format by choosing a category rather than specifying a specific source. In these circumstances, users may not be concerned with the source of the text content, but rather the content of a particular category. Therefore, a need exists for providing text-based content to users at client devices in an audible format.

SUMMARY

A system and method for aggregating text-based content and presenting the text-based content as spoken audio is described herein. In particular, a server module retrieves and aggregates web content (e.g., web pages) from web content providers (e.g., websites or web feeds). The web content may include text-based web content ("web text"). The server module then extracts and filters the web text from the retrieved web content, categorizes the extracted web text, and stores the web text in a data store. A client module submits a request to the server module for the aggregated and stored web text. The server module retrieves the stored web text from the data store and encodes it to obtain encoded content that includes the web text. The encoded content is in a format suitable for transmission to a client and for generating a speech audio signal based on the web text such that output of the speech audio signal presents the web text as spoken audio. For example, Extensible Markup Language ("XML") is a format that may be used for transmission of the encoded content and conversion of the web text to a spoken audio format.

Before transmission to the client, the encoded content may be compressed to obtain compressed content that includes the encoded content. The compressed content may be transmitted to the client where it can then be decompressed to access the encoded content. Zip compression, for example, may be used to compress the encoded content. The server module transmits the encoded content (or compressed content) to the client module. If the encoded content is compressed, the client module decompresses the compressed content locally to access the encoded content included in the compressed content. The client module also decodes the encoded content locally to access the web text. The client module then generates a speech audio signal based on the web text and may transmit the speech audio signal to an audio output device for presentation of the web text as spoken audio.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

FIG. 4 is a block diagram of an example back-end service server of the system for aggregating text-based content and presenting the text-based content as spoken audio of FIG. 1.

FIGS. 5 (a) and (b) are a portion of the page source of an example web page document.

FIG. 8 is an example XML-formatted document having encoded text-based content suitable for audible presentation at the client module.

DETAILED DESCRIPTION

Figure 1:
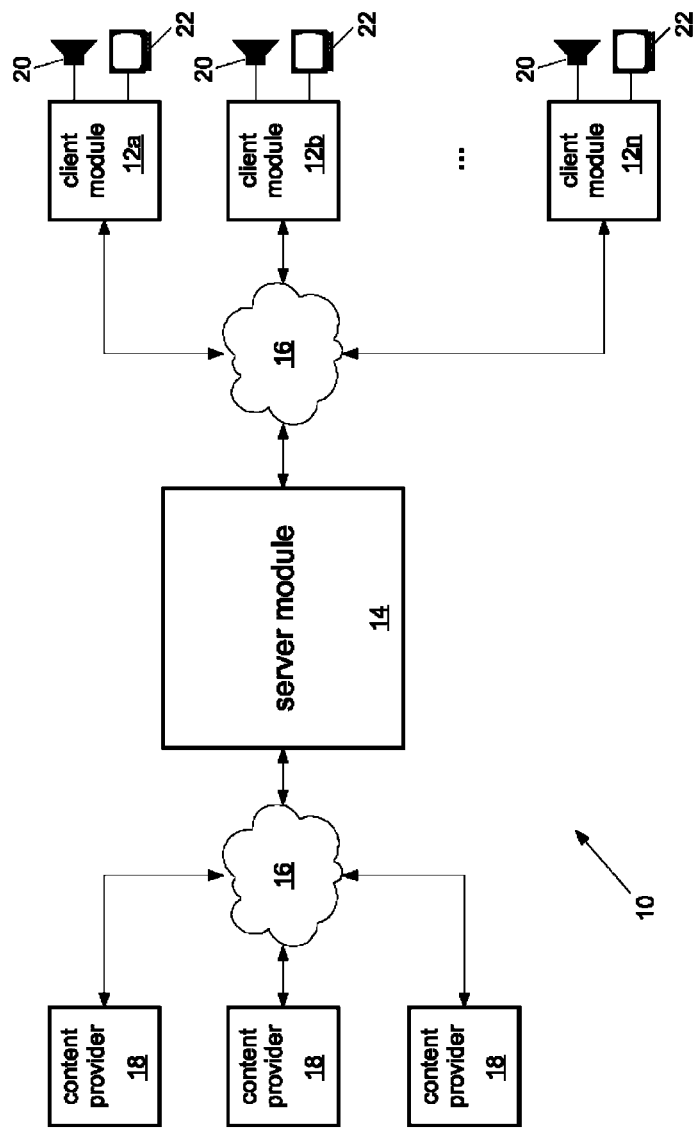
FIG. 1 is a block diagram of an example system for aggregating text-based content and presenting the text-based content as spoken audio at a client module in accordance with one example of an implementation of the invention.

A system and method for aggregating text-based content and presenting the text-based content as spoken audio is described herein. In particular, a server module retrieves and aggregates web content (e.g., web pages) from web content providers (e.g., websites or web feeds). The web content may include text-based web content ("web text"). The server module then extracts and filters the web text from the retrieved web content, categorizes the extracted web text, and stores the web text in a data store. A client module submits a request to the server module for the aggregated and stored web text. The server module retrieves the stored web text from the data store and encodes it to obtain encoded content that includes the web text. The encoded content is in a format suitable for transmission to a client and for generating a speech audio signal based on the web text such that output of the speech audio signal presents the web text as spoken audio. For example, Extensible Markup Language ("XML") is a format that may be used for transmission of the encoded content and conversion of the web text to a spoken audio format.

Before transmission to the client, the encoded content may be compressed to obtain compressed content that includes the encoded content. The compressed content may be transmitted to the client where it can then be decompressed to access the encoded content. Zip compression, for example, may be used to compress the encoded content. The server module transmits the encoded content (or compressed content) to the client module. If the encoded content is compressed, the client module decompresses the compressed content locally to access the encoded content included in the compressed content. The client module also decodes the encoded content locally to access the web text. The client module then generates a speech audio signal based on the web text and may transmit the speech audio signal to an audio output device for presentation of the web text as spoken audio.

The client modules of the system and method described below may not be browser-enabled and may not have the same access to web content as browser-enabled devices. Instead of visually presenting web content in a web browser, the system described advantageously presents the web text of the web content to a user at the client module as spoken audio. Additionally, delivering web text may use a relatively smaller amount of bandwidth compared to delivering multimedia content (e.g., image data, audio data, and video data). As an example, a conventional MP3 audio file may have been encoded with a sampling frequency of 44.1 KHz with 16 bits of data used for each data sample. Web text may comprise a comparatively smaller amount of data such as, for example, 7-bit ASCII or UTF-8 encoded information. The amount of bandwidth required to transmit the web text may be further reduced by compressing the encoded content that includes the web text before transmission to the client module. By generating a speech audio signal based on the web text at the client device, the system advantageously avoids transferring audio data across the network, which may use a relatively higher amount of bandwidth. As a result, quality-of-service degradation resulting from bandwidth limitations or other network limitations may be reduced.

System

Referring to FIG. 1, a block diagram of an example system 10 for aggregating web text and presenting the web text as spoken audio at a client 12 is shown. As seen in the example shown in FIG. 1, the system 10 has a server/client-based architecture. A server module 14 (i.e., a "service provider") is in signal communication with one or more client modules 12a-n via a network 16. The server module 14, in this example, is also in signal communication with one or more web content providers 18 via a network 16. A client module 12 ("client") may submit a request to the server module 14 via the network 16 and receive a response in return. Similarly, the server module 14 may submit a request to a web content provider 18 via the network 16 and receive a response in return. The server module 14 may also be adapted to automatically push data to a client 12 in response to a trigger as discussed further below.

The server module 14, in this example, is a cluster of one or more servers configured to carry out the functions of the system 10, which are described further below in reference to FIG. 3. Other configurations for the server module 14 may be selectively employed. The content providers 18 may be any type of server adapted to provide content over a network 16 in response to receipt of a request. For example, the content providers 18 may be web servers that provide web content in response to receipt of requests at the web servers. Web content may include, for example, web pages, web feeds (e.g., RSS feeds and Atom feeds), and any other type of web-related document. Example web content providers 18 include, but are not limited to, the websites and web feeds of Yahoo!, CNN, ABC, ESPN, etc.

The clients 12 are network- and audio-enabled devices. The client devices 12 are adapted to wiredly or wirelessly communicate with the server module 14 via the network 16. Client devices 12 may include, for example, desktop computers, laptop computers, tablet computers, cellular telephones, vehicle infotainment devices (e.g., in-vehicle navigation and/or entertainment units), video game consoles, televisions, television set-top boxes, and other network-enabled and audio-enabled computer devices.

The client devices 12, in this example, include an audio output device 20 and may also include a display device 22. The audio output device 20 may be any device capable of producing sound from an audio signal such as, for example, speakers and headphones. The audio output device 22 may also be a vehicle audio system in communication with the client device 12, which may be installed in the vehicle. The audio output device may selectively be an integral component to the client device 12. Additionally or alternatively, the client device 12 may be in signal communication with an audio output device and transmit the speech audio signal to the audio output device for presentation of the web text as speech.

The display device 22 may be any device capable of converting electrical signals into information presented in a visually perceivable form. For example, the display device 22 may be: a liquid crystal display (LCD), a cathode-ray tube (CRT) display, an electroluminescent display (ELD), a heads-up display (HUD), a plasma display panel (PDP), an organic light emitting diode (OLED) display, a vacuum fluorescent display (VFD), and the like. Further, the display device 22 may be adapted to receive input from the user on a touchscreen, via a stylus, or by voice command. Other types of input methods may be selectively employed.

The server module 14 may be adapted to communicate with the content providers 18 and the clients via a network 16 using one or a combination of wired and wireless technologies. For example, the server module 14 may communicate with the content providers 18 and the clients 12 using TCP/IP via a packet-switched network (e.g., the Internet). The server module 14 may additionally or alternatively communicate with the clients 12 via a cellular network or other wireless network. Other types of networks and networking protocols may be selectively employed.

Figure 2:
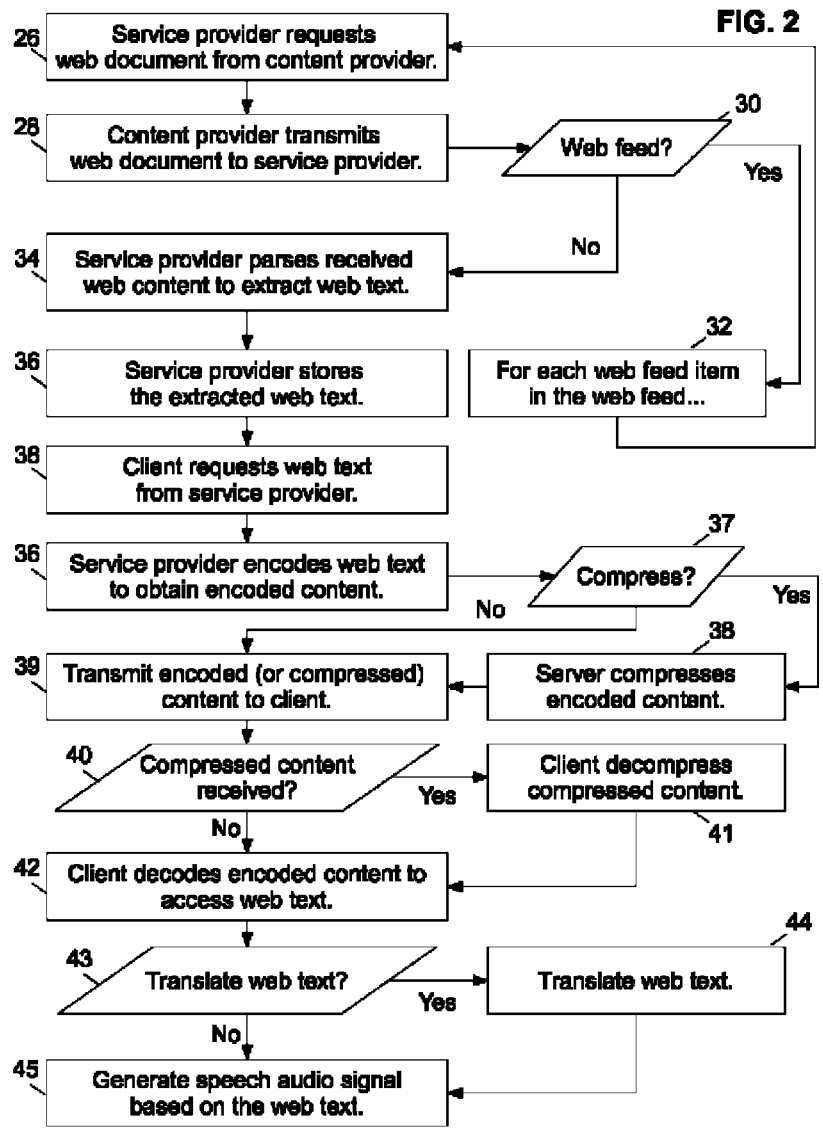
FIG. 2 is a flowchart of example method steps for aggregating and presenting text-based content in as spoken audio at a client module in accordance with one example of an implementation of the invention.

FIG. 2 is a flowchart 24 of example method steps for aggregating and presenting text-based content as spoken audio at a client 12. As seen in FIG. 2, the server module 14 submits a request for a web document from one or more content providers (step 26). The request may be in the form of an HTTP-request that includes a uniform resource locator (URL), and the response may be transmitted over the Internet. The server module 14 may automatically generate requests for web content from web content providers 18 at a periodic interval (e.g., hourly, daily, weekly, etc.). Additionally or alternatively, the server module 14 may request on-demand web content from web content providers in response to receipt of a request for web text from a client 12.

The requested web document may be a web page, web feed, or other type of web document. A web page may be an HTML-formatted document that includes various types of information that relates to the content, functionality, and the structure of the web page. Web content may include text-based content. Text-based content of a web page includes the text-formatted copy (written material) of the web page and the text-formatted information that relates to the copy of the web page. As used in this application, text-based content may also be referred to as "web text." Examples of web text include titles, headlines, authors, publication dates, and written material. Web content may also include non-text-based content (e.g., images, animations, audio, and video), interactive content (e.g., buttons, links, and forms), functional content (e.g. scripts), and structural content that relates the architecture of the web page (e.g., display information, HTML tags, comments, etc.). Web text may also be included in the metadata of a web document. For example, metadata may indicate an author, publication date, title, summary, etc. A web feed document may be, for example, an XML-based document having a list of individual content items that may include, for example, a title, a description, and a link to a web page.

In response to receipt of a request for web content from the server module 14 at the content provider 18, the content provider may transmit the requested web document to the server module (step 28). The response may be in the form of an HTTP-response that includes the requested web document and may also be transmitted over the Internet. The requested web document may be a single web page document or a web feed document that includes a list of web page documents ("web pages"). If the web document is a web feed document (step 30), the server module 14 may iterate through each web feed item (step 32) and may request the web page associated with the link (step 26). If the requested web document is a web page, the server module 14 preprocesses the web page, which includes parsing the HTML page source of the web page to extract the web text (step 34).

When parsing the web page to extract the web text, the server module 14 ignores or removes the non-text based content, interactive content, and functional content of the web page. Additionally, the server module 14 may ignore or remove web content that is not related to the web text (e.g., advertisements) during the parsing and extraction process. The server module 14 may then store the extracted web text in a data store (step 36). The server module 14 may also classify and categorize the web text during preprocessing. The extraction, categorization, and storage of the web text (i.e., preprocessing) will be discussed in further detail below with reference to FIG. 4.

Once the server module 14 has retrieved the web content, extracted the web text, and stored the web text, the server module may respond to requests for the web text received at the server module from clients 12. A client 12 may submit a request to the server module 14 for web text (step 38). A client 12 may transmit the request for web text to the server module 14 in, for example, an HTTP request over the Internet. In response to receipt of the request from the client 12, the server module 14, in this example, retrieves the stored web text from the data store, encodes the web text to obtain encoded content that includes the web text (step 36). The encoded content has a format suitable for transmission of the encoded content to the client 12 and for generating a speech audio signal based on the web text such that output of the speech audio signal presents the web text as spoken audio. If the server module 14 determines to compress the encoded content (step 37) before transmission to the client, then the server module 14 compresses the encoded content to obtain compressed content that includes the encoded content (step 38). The server module 14 may compress the encoded content using, for example, zip compression. The server module 14 may then transmit the encoded content or the compressed content (e.g., a zip-compressed XML-formatted document that includes web text) in, for example, an HTTP-response (step 39).

If the client 12 receives compressed content (step 40), the client may decompress the compressed content to access the encoded content (step 41) before decoding the encoded content to access the web text. The client then decodes the encoded content to access the web text included in the encoded content (step 42). If the client 12 determines to translate the web text (step 43), then the client translates the web text to obtain translated web text (step 44). The client then generates a speech audio signal based on the web text or translated web text such that output of the speech audio signal present the web text as spoken audio (step 45). The generation of the speech audio signal based on the web text will be discussed in further below with reference to FIG. 10. The client 12 may transmit the speech audio signal to an audio device 20 for output of the speech audio signal to present the web text as spoken audio.

As an addition or alternative to the method 24 set forth in FIG. 2, the system 10 may also be adapted to automatically transmit encoded content (or compressed content) to the clients 12 in response to a trigger. The trigger may be, for example, an event or the end of a periodic interval (e.g., the end of an hourly, daily, or weekly interval). An event may be, for example, breaking news or new updates posted to a website. The server module 14 may retrieve the newly updated web document from the content provider 18 (step 26), parses the web content of the web document to extract the newly updated web text (step 34), store the newly updated web text (step 36), and transmit encoded content that includes the newly updated web text to the client 12 (step 39). Additionally, the server module 14 may push data to a client 12 at a predetermined time interval such as, for example, hourly, daily, weekly, etc. In this alternative approach, the server module 14 automatically initiates the transmission of the encoded content to the client 12 in response to a trigger (i.e., something other than a request from the client).

Server Module

Figure 3:
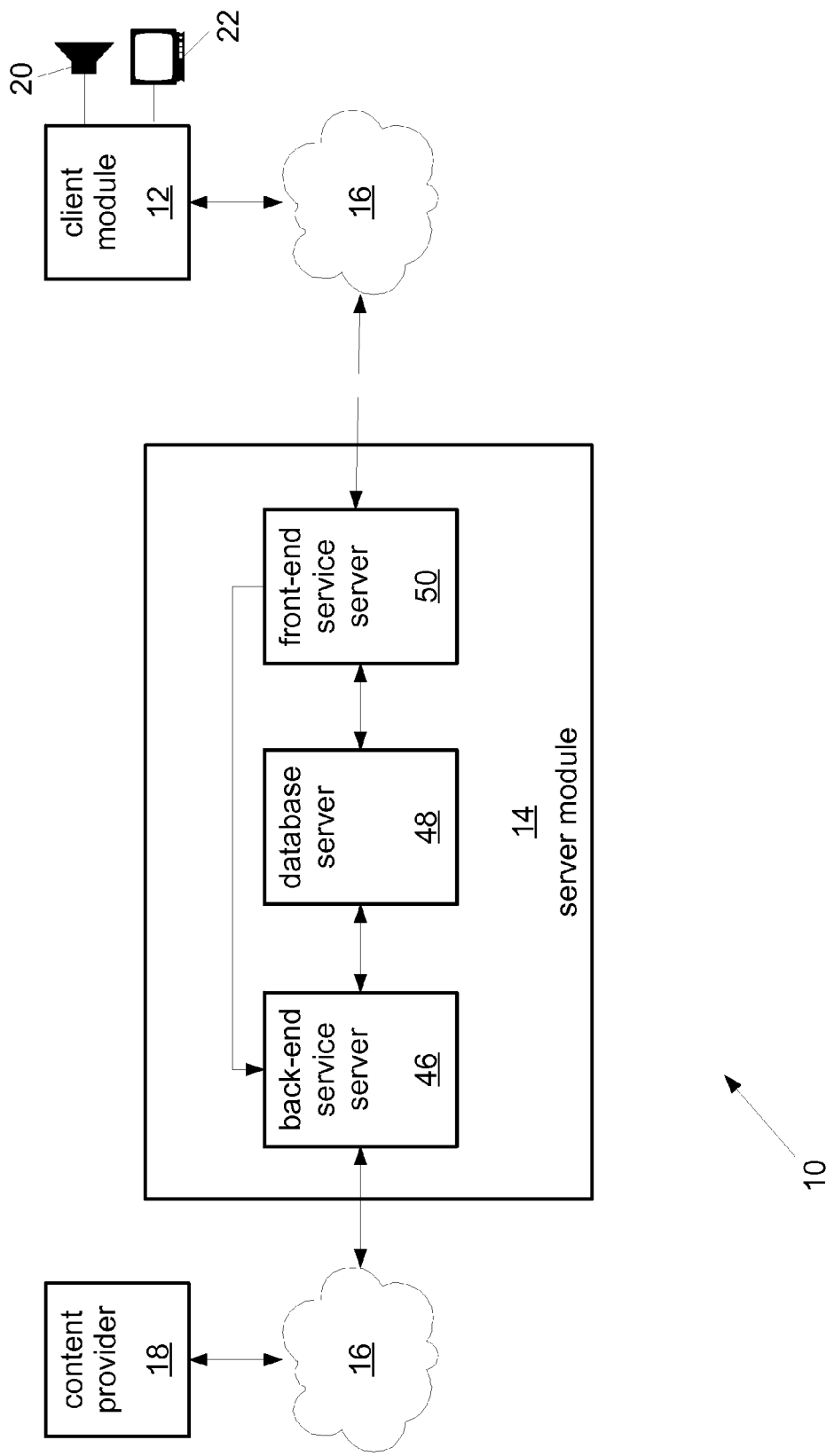
FIG. 3 is a block diagram of an example server module of the system for aggregating text-based content and presenting the text-based content as spoken audio of FIG. 1.

Referring now to FIG. 3, a block diagram of an example server module 14 of the system 10 for presenting web text as spoken audio is shown. The server module 14 may be one or more servers interconnected via a network such as, for example, a local area network (LAN). The server module 14 may be implemented as a single server configured to carry out the functions of the system 10 and method 24 for aggregating and presenting web text as spoken audio. Alternatively, the server module 14 may be implemented in a cloud configuration whereby the server module includes distributed servers interconnected via a network (e.g., a LAN) with each server adapted to carry out a particular function of the system 10. In one embodiments, for example, the server module 14 may be implemented as a XAMPP web server solution stack. The XAMPP web server solution stack may be cross-platform (X) and include, for example, an Apache HTTP server (A), a MySQL database (M), a PHP interpreter (P), and a Perl interpreter (P). The server module 14 may selectively include additional or alternative components.

In the example shown in FIG. 3, the server module 14 is implemented in a distributed configuration. The server module 14 includes a back-end service server 46 (BSS), a database server 48 (DBS), and a front-end service server 50 (FSS). In order to handle high-traffic situations, the server module 14 may also include a distributed cache and one or more proxy servers (not shown) to provide load balancing capabilities. As seen in the example of FIG. 3, the DBS 48 is in signal communication with the BSS 46 and the FSS 50. The FSS 50 may also be in signal communication with the BSS 46 as shown by way of example in FIG. 3.

The FSS 50, in this example, is the interface between the server module 14 and the clients 12. The FSS 50 exchanges communications with the clients 12 over the network 16 using a networking protocol such as, for example, TCP/IP and HTTP. The FSS 50 is configured to receive requests from the client 12, retrieve the web text from the DBS 48, dynamically encode the web text to obtain the encoded content, dynamically compresses the encoded content if desired, and transmit the encoded (or compressed) content to the client 12 in a response. The FSS 50 may also be configured to transmit to the BSS 46 instructions or commands to retrieve and store web text from a particular content provider 18 on an ad hoc basis. As discussed further below in reference to FIG. 7, the FSS 50 may also be configured to control access to the server module 14 by authenticating and authorizing clients 12 requesting web text.

The DBS 48, in this example, is the storage location for the web text received from the content providers 18. The DBS 48 receives storage requests from the BSS 46 for storing web text. In response to requests from the BSS 46, the DBS 48 may store the extracted web text in a predefined format as discussed further below with reference to FIG. 6. The DBS 48 may include one or more data storage modules also discussed further below. The database storage modules may be, for example, one or more databases. The databases may be implemented according to, for example, the relational database model. Additional or alternative database models may be selectively employed such as, for example, the flat-file model and the object-oriented model. Additionally, the databases of the DBS 48 may be implemented as a MySQL database management system or an SAS database management system. Additional or alternative database management systems may also be selectively employed.

The BSS 46, in this example, is the interface between the server module 14 and the content providers 18. The BSS 46 is configured to aggregate web text from various content providers 18. The BSS 46 generates requests for web documents (e.g., web pages and web feeds) and transmits the respective requests to the content providers 18. The BSS 46 may also communicate with the content providers over the network 16 using networking protocols such as, for example, TCP/IP and HTTP. The content providers 18 may transmit the requested web documents to the BSS 46 in response to the requests received from the BSS. The BSS 46 shown in FIG. 3, then extracts, categorizes, and stores the web text in the DBS 48 as mentioned above and discussed further below.

Back-End Service Server

Referring now to FIG. 4, a block diagram of an example back-end service server 46 (BSS) is shown. The BSS 46, in this example, includes modules 52-56 configured to retrieve, extract, and categorize the web text from content providers. In the example BSS of FIG. 4, the BSS includes a configuration module 52, an aggregation module 54, and a web content processing module 56. The configuration module 52, in this example, may be configured to indicate which content providers 18 to aggregate web text from. Accordingly, the configuration module 52 may include a list of content providers (i.e., a list of web pages and/or web feeds). The content provider list may be implemented, for example, as a flat file stored in a storage module (not shown) of the BSS 46. Alternatively, the content provider list may be implemented as a database table in a database of the BSS 46 or DBS 48. Other suitable implementations may be selectively employed for identifying the content providers. An example content provider listing may be as follows:
1. http://telematics.info/news/9357/GPS-Vulnerable-To-Threats-as-Jamming-Increases.html 2. http://telematics.info/news/9359/GPS-coordinates-for-the-trees.html
3. http://rss.news.yahoo.com/rss/topstories
4. http://rss.cnn.com/rss/cnn_tech.rss The configuration module 52 may also be configured such that the BSS 46 retrieves web content from the content providers 18 at a predetermined interval such as, for example, on a minute, hourly, or daily basis. The predetermined interval may be set globally for all items in the content provider listing, by type of content provider (e.g., web page-type versus web feed-type), and/or on an individual item basis. Additionally or alternatively, the BSS 46 may be configured to retrieve web content from a particular content provider 18 on an ad hoc basis in response to receipt of an instruction or command from the FSS 50 of the server module 14.

The configuration module 52 may also be adapted to associate categories and/or subcategories with the web page and web feed entries in the list. Example categories and subcategories may include news, sports, weather, stock quotes, and the like. The configuration module 52 may be selectively adapted to provide additional or alternative configuration settings. The BSS 46 may also be additionally or alternatively adapted to analyze the received web document and categorize the web text automatically based on the type of content provider and/or the web content of the web document.

An administrator may manage and update the listing of content providers via an administration interface (not shown) that is coupled to the BSS 46. The administrator may add, remove, or modify the items in the content provider list of the configuration module 52. Additionally, the administrator may add or modify the web content categories and/or the intervals at which the BSS 46 requests the web content from the content providers 18. In the example of FIG. 4, the configuration module 52 is coupled to the aggregation module 54 providing the aggregation module with access to the listing of content providers and configuration settings. Additionally or alternatively, users at the client devices 12 may select and specify the content providers 18 (i.e., user-selected content providers) to aggregate web text from. As discussed in more detail below, the system 10 may be adapted to receive user-selected content providers from the clients 12.

The aggregation module 54, in this example, is configured and adapted to transmit requests to the content providers 18 for web content, receive the web content from the content providers, and send the received web content to the web content processing module 56 for preprocessing. The aggregation module 54 may be adapted to request and receive both web pages and web feeds. In the example shown, the aggregation module 54 includes a webpage aggregation sub-module 58 and a web feed aggregation sub-module 60. The webpage aggregation sub-module 58, in this example, is adapted to request web pages from content providers 18. The web feed aggregation sub-module 60, in this example, is adapted to request a web feed document from a web feed provider 18 and iterate through the list of web feed items in the received web feed document. If the web feed items include a link to a web page, the web feed aggregation sub-module 60 may use the webpage aggregation sub-module 58 to request the web page associated with the link. Web feed aggregation sub-modules 60 that are used to aggregate content from RSS web feeds may be referred to as an "RSS parser module" or an "RSS fetching module."

Further, the BSS 46, in this example, may only aggregate the web text of web content received from a web content provider. In other words, the BSS 46 may be configured not to transmit subsequent requests for any non-text-based content such as, for example, image files, video files, script files etc. As a result, the BSS 46, in this example, may be configured to only request the web document (e.g., the HTML-formatted web page) and withhold requests for any image, video, or script files referenced or linked to in the web document.

The BSS 46 may include one or multiple aggregation modules 54. Multiple aggregation modules 54 may each be configured for retrieving web content from a particular content provider 18 using the appropriate application programming interface (API) defined by the content provider, which may include various HTTP and XML protocols. Different content providers 18 may define different APIs. For example, APIs may specify different parameters and rules for requesting web content. As a result, multiple aggregation modules 54 may be employed with each aggregation module respectively configured to use the API defined by a particular content provider 18. For example, the BSS 46 may include a "Yahoo! aggregation module," a "CNN aggregation module," and an "ESPN aggregation module" where each aggregation module is respectively configured to use the Yahoo! API, CNN API, and ESPN API.

Additionally or alternatively, one aggregation module 54 may be configured to use multiple APIs and adapted to request web content from multiple content providers 18 using the appropriate API. The APIs of various content providers may be embodied in individual rule profiles respectively used by the aggregation module 54 when retrieving web content from the various content providers. As another example, the BSS 46 may include a Yahoo! rule profile, a CNN rule profile, and an ESPN rule profile. Accordingly, the aggregation module 54 may apply the ESPN rule profile when retrieving web content from ESPN and apply the CNN rule profile when retrieving content from CNN. The rule profiles may be selectively stored at a storage module (not shown) of the BSS 46 or, alternatively, in the DBS 48.

After the aggregation module 54 has submitted a request to a content provider 18 and received a web document in response, the aggregation module sends the web document to the web content processing module 56 for preprocessing. As mentioned above, the web content processing module 56, in this example, parses the web content to extract the web text from the web document and sends the extracted web text to the DBS 48 for storage.

The web content processing module 56 functions as a preprocessor and is adapted to extract the web text from the web content of the web document. The web content processing module filters out interactive, functional, structural, and other non-text-based content. FIGS. 5 (a) and (b) are a portion of the HTML page source 62 of an example webpage document 64. As seen in FIGS. 5 (a) and (b), the HTML page source 62 for the webpage 64 includes web text 66 (e.g., title, author, category, and written material), image content 68, interactive content 70 (e.g., links), functional content 75 (e.g., scripts), and structural content 74 (e.g., metadata, document sections, etc.). During preprocessing, the web content processing module 56, in this example, extracts the web text 66 from the web content of the web document and prepares it for storage at the DBS 48.

Content providers 18 may structure and format their respective web documents using different predetermined formats: Yahoo! web pages and web feeds may be structured differently and include different web content than CNN web pages and web feeds (i.e., include different HTML tags and have a different HTML structure). As a result, the web content processing module 56 may apply a parsing strategy designed for the predetermined format used by a particular content provider 18. The parsing strategy may be designed to filter and extract the web text from a particular content provider based on the particular web document structure unique to each content provider. For example, the web content processing module 56 may apply a "Yahoo! parsing strategy" when receiving web content from the Yahoo! website and a different "CNN parsing strategy" when receiving web content from the CNN website. The parsing strategies may be designed to analyze and distinguish the particular HTML structure and the particular HTML tags used by the content providers (i.e., tags associated with the title, headline, author, publishing date, main body text, etc. of the web document). Like the aggregation module 54, multiple sub-modules (not shown) of the web content processing module 56 may each be adapted to implement a respective parsing strategy designed for a particular content provider 18. For example, the web content processing module 56 may include a "Yahoo! preprocessing sub-module" for preprocessing Yahoo! web documents using a Yahoo! parsing strategy and a "CNN preprocessing sub-module" for preprocessing CNN web documents using a CNN parsing strategy.

Alternatively, the parsing strategies may be implemented as various parsing profiles containing respective parsing rules designed for the predetermined formats used by particular content providers 18. The web content processing module 56 may select an appropriate parsing profile based on the source of the web document. For example, the web content processing module 56 may load and use a "Yahoo! parsing profile" to preprocess Yahoo! web documents and a "CNN parsing profile" to preprocess CNN web documents. The parsing profiles may be stored at a storage module (not shown) of the BSS 46 or at the DBS 48. An administrator may also use the administration interface discussed above to add or modify the parsing strategies and parsing rules used by the preprocessing sub-modules or contained in the parsing profiles.

Once the web content processing module 56 has parsed the web text from a web document, the web content processing module may store the extracted web text in the data storage modules of the DBS 48.

Database Server

Figure 6:
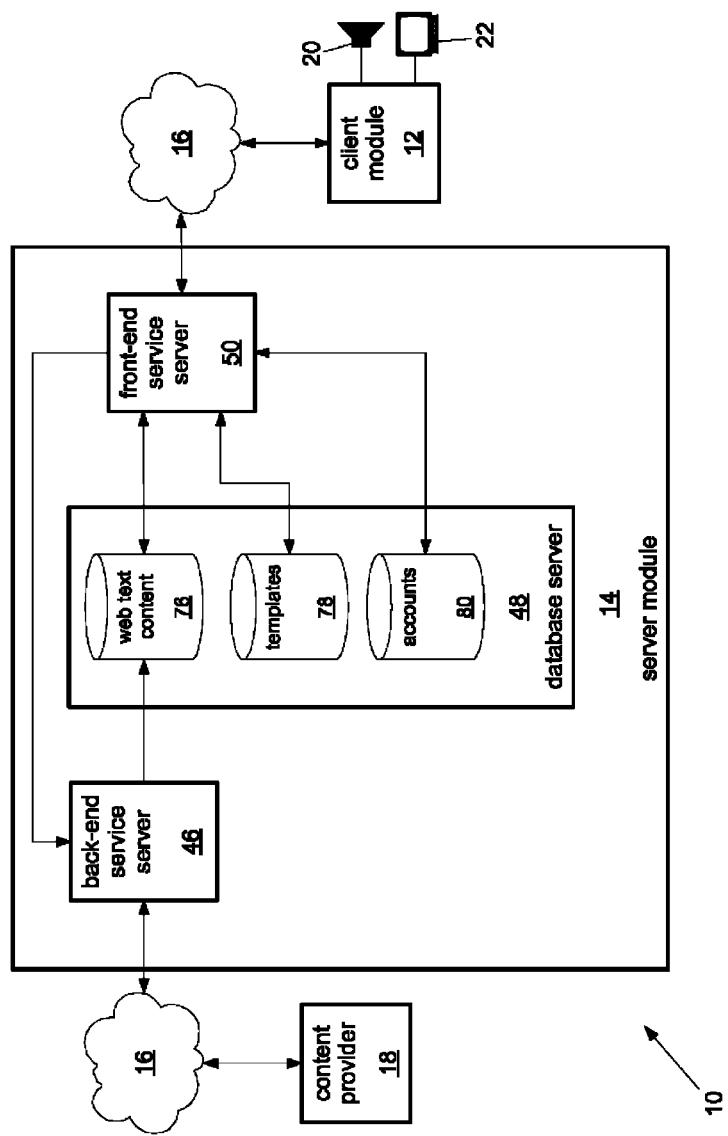
FIG. 6 is a block diagram of an example database server of the system for aggregating text-based content and presenting the text-based content as spoken audio of FIG. 1.

Referring now to FIG. 6, a block diagram of an example database server 48 (DBS) in an example system 10 is shown. The DBS 48 stores web text received from the BSS 46 and supplies the stored web text to the FSS 50 for transmission to a client 12. Additionally, the DBS 48 may also store templates used to encode and format the web text prior to transmission to the clients 12. The DBS 48 may additionally store account information that relates to clients using the system 10, which are discussed in more detail below in reference to FIG. 7.

As mentioned above, the DBS 48 may be implemented as a relational database (e.g., an SQL, MySQL, or SAP database). The DBS 48 may store the extracted web text in separate tables of a single database or may distribute the web text among the tables of multiple databases. For example, multiple databases may be used for each category of web text, for example, a news database, a sports database, a weather database, a stock quote database, and the like. In the example shown, the DBS 48 includes one content database 76 to store each type of web text. Accordingly, the web text may be stored in one or more tables of the content database 76. For example, the content database 76 may include one or more web text tables and a category table.

The web text tables may store each item of web text in respective rows of the web text tables. The category table may store the available categories in respective rows of the category table. A single web text table may be employed to store multiple types of web text items (i.e., a single table for news, sports, weather, stock quotes, etc.). Additionally or alternatively, multiple web text tables may be employed and adapted for a particular type of web text item (e.g., a news item table, a sports item table, a weather item table, a stock quote item table, etc.). Additional or alternative tables may selectively be employed.

The web text tables may include multiple fields (columns) for storing the web text extracted by the web content processing module 56 of the BSS 46. The fields of the web text table may depend on the type of web text stored in the table. For example, a news item table may include: a unique identifier; a category identifier; the natural language of the news item (e.g., English or Chinese); a title; a sub-title; a reference URL for the news webpage; the written copy of the news item; a creation date for the stored news item; and a modification date of the stored news item. Additional or alternative fields may selectively be employed based on the type of web text stored and the types of web text extracted from the web document. For example, a stock quote item table may include fields for the stock symbol and stock price.

The category table may include: a unique identifier and the name of the category. As discussed above, the web text table may include a category identifier for storing the unique identifier of a category in the category table. By storing a category identifier, a relationship may be established between the web text item stored in the information table and a category stored in the category table. Other approaches for indicating the category of a web text item may be selectively employed.

As mentioned above, the DBS 48 may also include a template database 78 for storing templates the FSS 50 may use to encode the web text and obtain the encoded content. Each template may be respectively designed for a particular type of web text (e.g., news, sports, weather, stock quotes, etc.). Additionally or alternatively, the templates may be respectively designed to encode the web text based on the particular content provider 18 that provided it. For example, the FSS 50 may use a news template to encode and format news web text items; a sports template for sports web text items; a weather template for weather web text items, etc. Similarly, the FSS 50 may use a Yahoo! template for Yahoo! web text items; a CNN template for CNN web text items; and an ESPN template for ESPN web text items. Accordingly, the template database 78 may also indicate the type of web text associated with a template (e.g., news, sports, weather, Yahoo!, CNN, ESPN, etc.). The template database 78 may store the template itself and/or the location of the template at a storage module of the DBS 48 (not shown). As an alternative, a storage unit (not shown) at the FSS 50 may store the templates. Encoding text-based content using the templates will be discussed below in further detail with reference to FIG. 7.

The DBS 48 may further include an account storage module 80. The account storage module 80 may be an account database that stores account information for clients 12 that request web text from the server module 14. As discussed below in more detail, access to the server module 14 may be subscription-based and controlled by the FSS 50.

Accordingly, the server module 14 may require clients 12 to provide a username and password for authentication and authorization. The account database 80 may store client information such as, for example, access credentials (e.g., a username and password), the type of client device, and other types of account information.

The account database may also store client profiles respectively associated with clients 12 that access the system 10. The client profile may include a list of predetermined categories a user desires to receive web text from. In this way, encoded content may be selectively transmitted to a user that includes web text associated with at least one of the categories listed in the client profile. The client profile may also include a list of preferred content providers 18 such that encoded content may be selectively transmitted to the user that includes web text respectively associated with one or more of the preferred content providers. Users may manage the list of desired web content providers and desired web content categories via an account management interface (not shown) such as, for example, a web interface in a web browser. Account management will be discussed in more detail below with reference to FIG. 7.

An administrator may additionally use the administration interface mentioned above to manage the databases of the DBS 48. An administrator may add tables, modify existing tables, or add entries to the tables of the various databases of the DBS 48. For example, an administrator may add or modify categories, templates, or accounts.

Once the DBS 48 has stored the web text, it is available to the FSS 50 for encoding and transmission to the client.

Front-End Service Server

Figure 7:
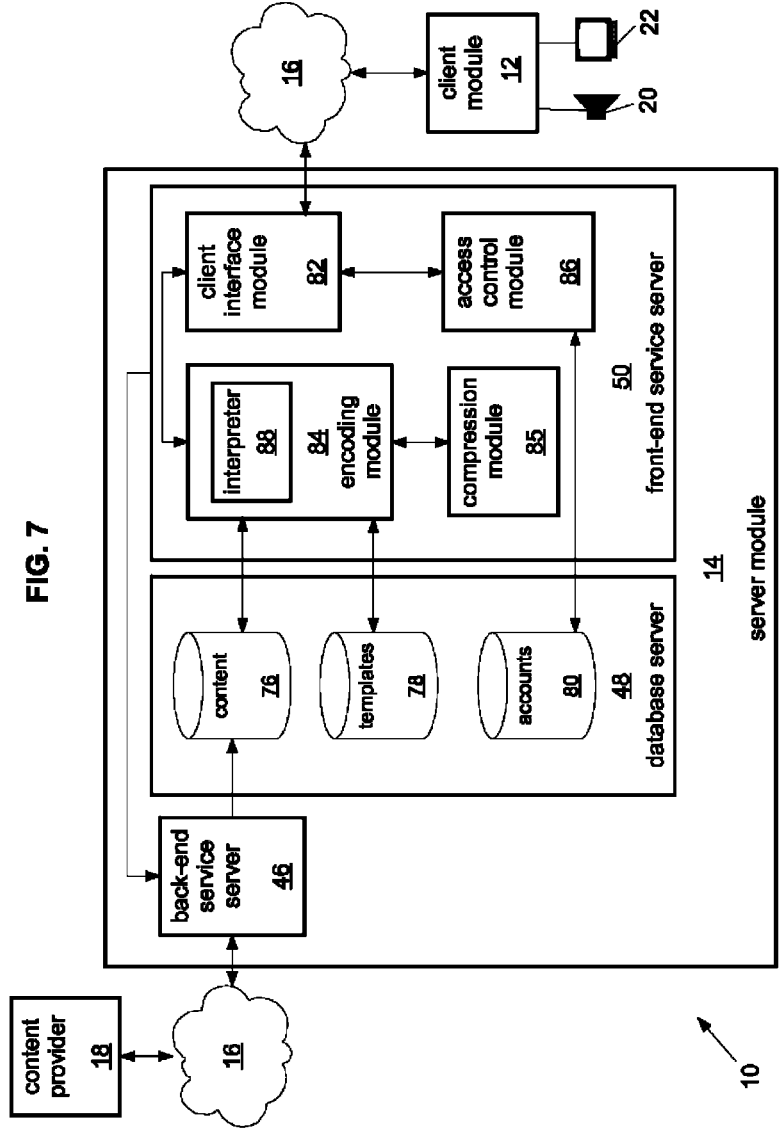
FIG. 7 is a block diagram of an example front-end service server and an example database server of the system for aggregating text-based content and presenting the text-based content as spoken audio of FIG. 1.

Referring now to FIG. 7, a block diagram of an example front-end service server 50 (FFS) and an example database server 48 (DBS) of an example system 10 is shown. The FSS 50, in this example, includes modules 82-86 configured to receive requests for web text from clients 12, retrieve web text stored at the DBS 48, encode the web text to obtain encoded content that includes the web text, compress the encoded content to obtain compressed content that includes the encoded content, and transmit the encoded (or compressed) content to the client in a response. As mentioned above, client access to the system may be subscription-based. In subscription-based systems, the server module 14 will not transmit web text to a client 12 if the request the client and, accordingly, the request for web text from the client are not associated with a valid subscription. Accordingly, the FSS 50 may be adapted to provide authentication, authorization, and account (AAA) capabilities and include one or more modules for controlling and managing client access.

As seen in FIG. 7, the FSS 50, in this example, includes a client interface module 82 and an encoding module 84. The FSS may also include a compression module 85 and an access control module 86. The client interface module 82, in this example, is adapted to receive requests for web text from clients 12 and respond to the client with encoded content that includes the requested web text. The access control module 86, in this example, is adapted to authenticate, authorize, and manage client access to the server module 14. The encoding module 84, in this example, is adapted to retrieve web text stored at the DBS 48 and encode the web text to obtain encoded content that includes the web text.

The client interface module 82 may be, for example, an HTTP server adapted to receive HTTP requests and transmit HTTP responses. The client interface module 82 may also define an application programming interface (API) for receiving requests from clients 12. The API may specify the form of the request and the parameters a client 12 may use when requesting web text from the server module 14. For example, the client interface API may specify that a request for text-based content is in the form of a URL request. Example URL requests may include:
http://www.harman.com/myVoice/newsCategoryBrowser-php, and
http://www.harman.com/myVoice/newsContentBrowser-php.

The API may also specify parameters associated with the requested web text that a client 12 may append to the URL requests. Example parameters include: a session identifier; a client device identifier; a user identifier; a user password; an authenticator; a category name or identifier; a location; a language; and a page number. Additional or alternative parameters may be selectively defined. The page number parameter may specify a subset of web text items available from the server module (e.g., page=1 for items 1-5, page=2 for items 6-10, etc.).

The authenticator may be an MD5 hash of one or more of the parameters such as, for example, the client device identifier, the user identifier, and the user password. The client 12 may append the authenticator to the URL request as a parameter allowing the FSS 50 to distinguish valid requests from invalid requests. Accordingly, an HTTP request from a client 12 may include the following example URL:
http://www.harman.com/myVoice/
newsContentBrowser.php?sessionID=92626&authentica
tor=d41d8be224f0bb204e9800be224ecf1138e&category=
technology&location=Chicago&language=English&page=1

Additionally, the server module 14 may be adapted to receive user-specified content providers 18 from the clients 12 as mentioned above. Accordingly, a client 12 may use the registration interface or an account management interface (not shown) to specify the desired content providers 18. The DBS 48 may also store the user-specified content providers in a client profile as discussed above. The BSS 46 may access the account database 80 to retrieve the user-specified content providers in order to retrieve and extract the web text from the user-specified content providers 18.

Further, the server module 14 may additionally or alternatively be adapted and configured such that a user may specify a predetermined content provider in the request for web text. In this way, clients 12 may request that the server module 14 receive web text from a particular web content provider 18 on an ad hoc basis, and the encoded content received in response to the request may include web text that is associated with the user-specified web content provider (e.g., retrieved from the user-specified content provider). An example URL request that includes a user-specified content provider (e.g., http://search.espn.go.com/rss/poker/) may be as follows:
http://www.harman.com/myVoice/
contentSelector.php?sessionID=92626authenticator=d41d
8be224f0bb204e9800be224ecf1138e&content=http://
search.espn.go.com/rss/poker/&language=English Users may also specify a desired category in this fashion as well. An example URL request that includes a user-specified category (e.g., sports) may be as follows:
http://www.harman.com/myVoice/
contentSelector.php?sessionID=92626&authenticator=d
41d8be224f0bb204e9800be224ecf1138e&category=sports
&language=English Additionally or alternatively, the server module 14 may retrieve and encode web text from the list of predetermined web content providers indicated in a client profile. In this circumstance, the client 12 may submit a request for web text to the server module 14. In response, the server module 14 may retrieve the client profile for the client 12 and retrieve web text associated with one or more of the predetermined web content providers 18 listed in the client profile. The server module 14 may encode the web text for the content providers 18 listed in the client profile and transmit the encoded content to the client 12. In this way, users may initially set up a desired list of content providers and receive web text associated with the desired content providers when requesting web text from the server module 14. Web text associated with a predetermined web content provider 18 may be, for example, web text parsed from web content retrieved from the predetermined web content provider.

Similarly, the server module 14 may retrieve and encode web text associated with the predetermined categories listed in a client profile associated with the client 12. Web text may be associated with a category during the preprocessing stage when the web content processing module 56 categorizes and stores the web text parsed from the web content.

As discussed above, the FSS 50 of the server module 14 may also include a compression module 85 that compresses the encoded web text to obtain compressed content that includes the encoded content. The FSS 50 may then transmit the compressed content to the client 12. Compressing the encoded web text to obtain compressed content before transmission to the client further reduces the amount of bandwidth needed to provide the client 12 with web text. The compression module may compress the encoded web text according to a compression format such as, for example, gzip, 7z, RAR, StuffIt, and ZIP. As discussed further below, the client 12 decompresses the compressed content to access the encoded content before decoding the encoded content.

In response to receipt of the HTTP request containing the URL, the access control module 86 of the FSS 50 may authenticate the request and authorize clients 12 to access the server module 14. Prior to making a request, a client 12 may use a registration interface (not shown) to register with the server module 14 and specify a desired username and password (i.e., access credentials). The DBS 48 may store the access credentials for the client 12 in a new client account record of the account database 80. The access control module 86 may determine whether clients 12 requesting web text from the server module 14 are associated with a valid subscription, based on the access credentials included in the request for web text. If the request for web text does not include access credentials or invalid access credentials, the access control module 86 may determine the request is not associated with a valid subscription and the server module 14 may not respond to the request with the requested web text. If the request includes valid access credentials, the access control module 86 may determine the client and request for web text are associated with a valid subscription.

A user who has previously registered with the server module 14 may initially request access to the server module 14 by providing the appropriate access credentials in a request to the FSS 50. The access control module 86 may retrieve the access credentials for the client account stored in the account database 80 of the DBS 48 and compare the stored access credentials to the supplied credentials. If the credentials match, the access control module 86 of the FSS 50 may initiate a session with the client 12 and provide a session identifier to the client. The client 12 may then use the session identifier and an authenticator as described above to make subsequent requests to the server module 14 for web text. When responding to subsequent requests, the FSS 50 may use the access control module 86 to authenticate the request using the supplied session identifier and authenticator. In this way, the access control module 86 may distinguish valid client requests from invalid client requests. If the access control module 86 fails to authenticate the client request, the access control module may determine the client request is invalid. In this circumstance, the FSS 50 may not respond to the client request or respond with an error message. If the access control module 86 successfully authenticates the client request, the FSS 50 may respond to the client with the requested web text. The access control module 86 may use additional or alternative information (e.g., the authenticator parameter discussed above) to determine whether a client and the client's request for web text are associated with a valid subscription.

Upon successful authentication of a client request for web text, the encoding module 84 encodes the web text to obtain encoded content that includes the web text, and the compression module 85 may compress the encoded content that includes the encoded content. The encoding module 84 retrieves the requested web text from the content database 76 of the DBS 48 and encodes the retrieved web text using a format suitable for transmission of the encoded content to the client and suitable for generating a speech audio signal based on the web text included in the encoded content. For example, an ASCII or Unicode character-encoding scheme may be used for the web text, and the encoding module 84 may further encode the web text using XML to identify various attributes relating to the web text (e.g., title, author, publication date, etc.). The encoding module may use an XML schema that is adapted for the type of web text requested (e.g., news, sports, weather, stock quotes, etc.). Other formats suitable for transmitting the encoded content to the client and for generating a speech audio signal based on the web text included in the encoded content may be selectively employed.

The encoding module 84 may use a template document ("template") to encode the web text. Accordingly, the encoding module 84 of the FSS 50 may also be adapted to retrieve the appropriate template for the web text from the template database 78 of the DBS 48 (or a storage module of the FSS 50 as mentioned above). Web text may be associated with a particular category, and the category may be associated with a particular template. The encoding module 84 of the FSS 50 may retrieve the appropriate template for the web text to be encoded (e.g., the template associated with the web text item) and use the template to encode and format the web text. The encoding module 84 may utilize dynamic webpage technology such as, for example, PHP or JSP to encode and format the web text. Accordingly, the encoding module may include a dynamic webpage interpreter 88 as shown by way of example in FIG. 7. The interpreter 88 may be, for example, a PHP interpreter or a JSP interpreter.

The encoding module 84 may use the interpreter 88 and a dynamic page file (e.g., a PHP or JSP file) to generate the encoded content as, for example, an XML-formatted document that includes the web text. The dynamic page file may include XML tags for encoding the web text and placeholders for the retrieved web text (e.g., $title, $pub_date, $plain, $content, $website, etc.). The interpreter 88 of the encoding module may interpret the dynamic page file and replace the appropriate placeholders with the appropriate web text.

A portion of an example PHP file that may be used for a news web text item may include the following encoding and formatting scheme:

```
<?xml version="1.0" encoding="utf-8">
<result>
```

-continued

```
<title>$title</title>
<pub_date>$pub_date</pub_date>
<plain>$plain</plain>
<content>$content</content>
<website>$website</website>
<result>
```

FIG. 8 shows an example XML-formatted document 90 that an interpreter 88 of the encoding module 84 may generate. As seen in FIG. 8, the example placeholders mentioned above have been replaced with the appropriate web text stored at the content database 76 of the DBS 48. Other template configurations and placeholders may be selectively employed to encode other types of web text items such as, for example, sports, weather, stock quotes, etc.

Figure 9A:
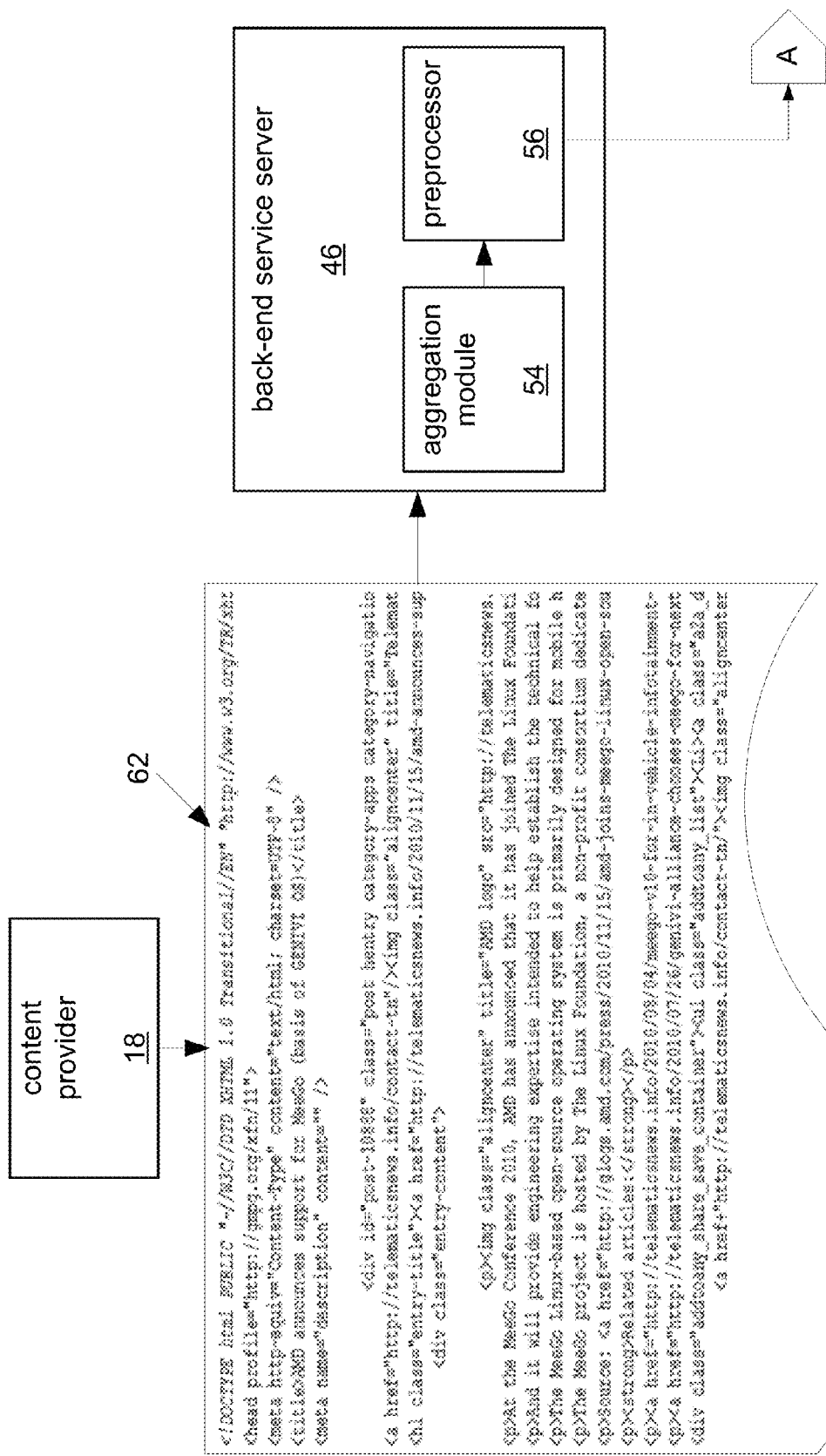
FIGS. 9 (a) and (b) are a block diagram of an example process for aggregating, storing, and encoding text-based content retrieved from content providers in accordance with one example of an implementation of the invention.
Figure 9B:
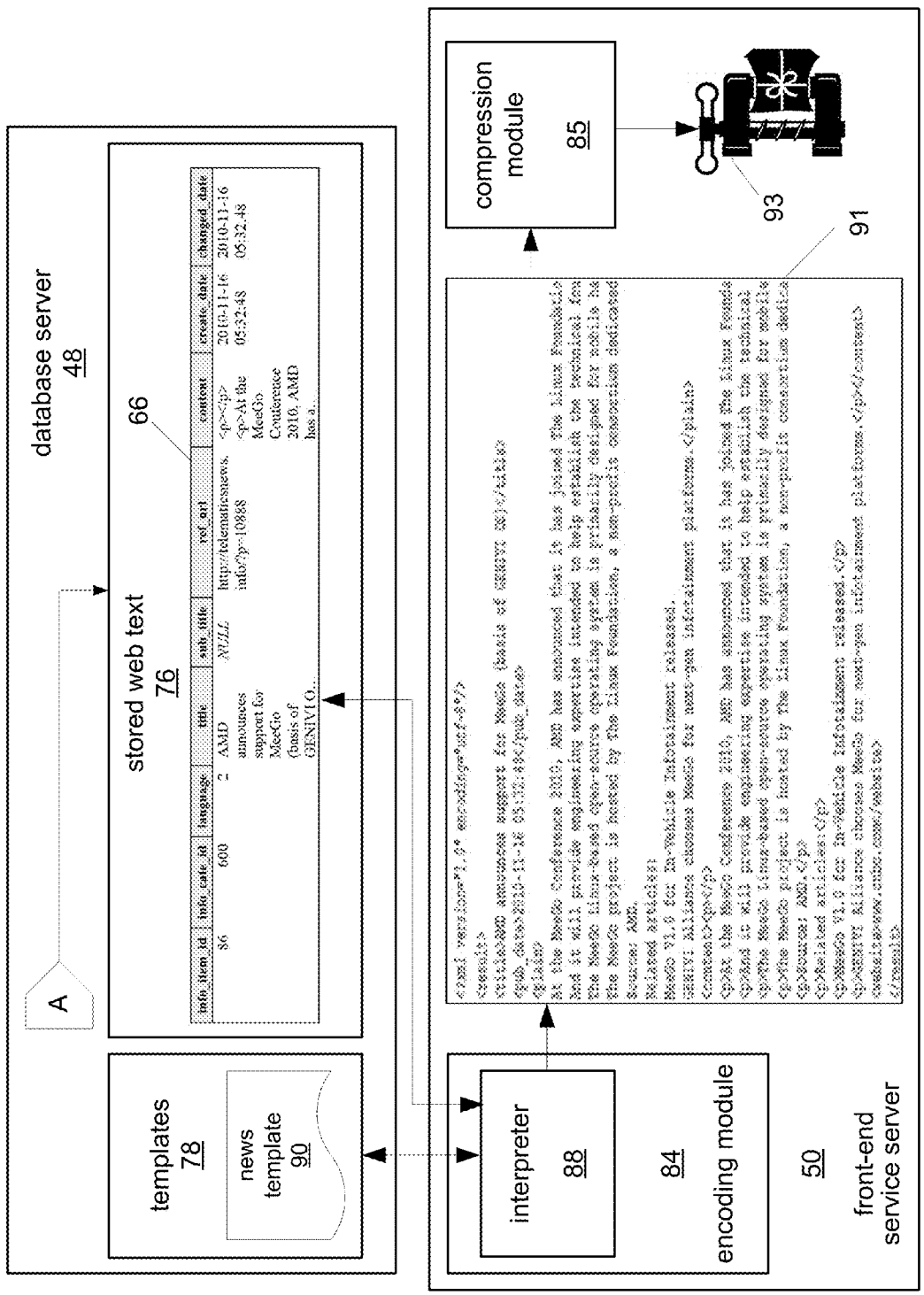

FIGS. 9 (a) and (b) are another block diagram of an example process for aggregating, storing, and encoding web text retrieved from content providers. The content provider 18 supplies an aggregator 54 of the BSS 46 with a web document 64. The aggregator 54 supplies the preprocessor 56 with the web document 64. The preprocessor 56 extracts the web text 66 from the web content of the web document 64 and stores the web text in a database of the DBS 48. An interpreter 88 of the FSS 50 retrieves the web text from the DBS 48 and an appropriate temple 90 from the template database 78 of the DBS. The interpreter 88 then uses the template 91 to encode and format the web text to generate encoded content 91, which is an XML document in this example.

Once the encoding module 84 has generated the encoded content 91, the compression module 85 may receive the encoded content (i.e., the XML document) and reduce the size of the document using, e.g., one of the compression methods mentioned above to obtain compressed content 93. The client interface 82 of the FSS 50 may then transmit the compressed content 93 to the client 12 in, for example, an HTTP response. Once the client 12 receives the compressed content 93, the client 12 may decompress the compressed content to access the decoded content 91, decode the encoded content to access the web text 66, and generate a speech audio signal based on the web text included in the encoded content. The speech audio signal may be output at an audio output device 20 at the client 12.

Client

Figure 10:
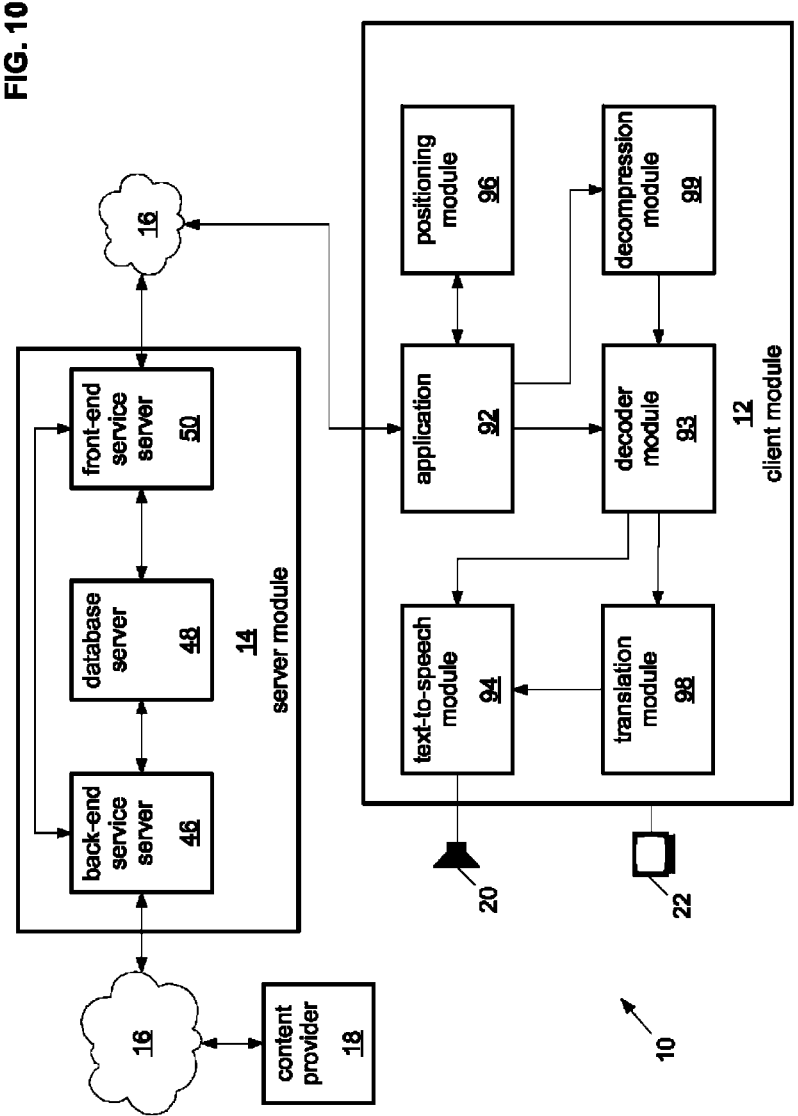
FIG. 10 is a block diagram of an example client module of the system for aggregating text-based content and presenting the text-based content as spoken audio of FIG. 1.

Referring now to FIG. 10 a block diagram of an example client module 12 of an example system 10 is shown. As mentioned above, the client module 12 may be a network- and audio-enabled computer device. The client device 12, in this example, includes an application 92 for managing the communications exchanged between the client device and the server module 14, a decoder module 93 for decoding the encoded content, and a text-to-speech (TTS) module 94 for generating a speech audio signal based on the web text included in the encoded content. The client 12, in this example, also includes an audio output device 20 for outputting the speech audio signal generated by the TTS module 94. The audio output device 20 may be, for example, speakers, headphones, and other devices capable of converting an electrical signal into sound.

The client device 12 may also include a positioning module 96 for determining the location of the client device such as, for example, a global positioning system (GPS) unit; a translation module 98 for translating the web text from one natural language to another natural language (e.g., from English to Chinese); and a decompression module 99 for decompressing compressed content to access the encoded content included in the compressed content.

The client device 12 may include an application 92 that interfaces with the server module 14 and performs various functions associated with requesting web text from the server module, generating a speech audio signal based on the web text, and outputting the speech audio signal to present the web text as spoken audio. The application 92 of the client device 12 may be implemented as software or firmware and stored in a storage unit (not shown) of the client device. The application 92 may include instructions capable of being executed by a processing device (not shown) of the client device.

The application 92 may generate a request to initiate a session with the server module 14 by generating, for example, an HTTP request that includes a URL request conforming to an API of the server module as discussed above. The application 92 may build the URL request with the appropriate parameters for initiating a session with the server module 14 and requesting web text from the server module. The application 92 of the client device 12 may also receive the requested web text in, for example, a compressed XML-formatted document that is delivered in an HTTP response.

In an example usage scenario, the client device 12 may first request from the server module 14 the available categories. A user at the client 12 may then select a particular category, and the client device 12 may request the web text items associated with the selected category. The server module 14 may then transmit to the client 12 encoded content that includes web text associated with the selected category. A user may then select a particular web text item for presentation as spoken audio at the audio output device 20. Other approaches for selecting and retrieving categories and web text items using the client device 12 may be selectively employed.

Upon receipt of a response from the server module 14, the application 92 of the client device 12 determines if the client 12 has received compressed content. If the client device 12 has received compressed content, the application 92, in this example, sends the compressed content to the decompression module 99. The decompression module decompresses the compressed content to access the encoded content. The decompression module 99 may use one of the compression technologies discussed above (e.g., gzip, 7z, RAR, StuffIt, and ZIP) to decompress the compressed content in order to access the encoded content. The application 92, in this example, then sends the encoded content to the decoder module 93 to decode the encoded content in order to access the web text included in the encoded content. If client device 12 receives encoded content rather than compressed content, then the application 92 sends the encoded content to the decoder module 93 for decoding.

The decode module 93 is configured to decode the encoded content to access the web text included in the encoded content. The decode module 93 may be, for example, an XML decoder that parses the XML document to extracts the web text that are encoded by the XML tags in the XML document.

The decoder module 93, in this example, may then send the web text to the TTS module 94 that generates a speech audio signal based on the web text. The TTS module 94 may be configured to output speech in multiple languages (e.g., both Chinese and English). Accordingly, the decoder module 93, in this example, may instead send the web text to a translation module 98 so that the translation module may translate the web text prior to the generation of the speech audio signal. The translation module 98 may convert the web text from one natural language to another natural language, for example, from English to Chinese or from Chinese to English. The translation module 98 may send translated web text to the TTS module 94 for conversion into a speech audio signal based on the translated web text. Using a translation module 98 enables a client device 12 to request web text in a one language and have the web text output as spoken audio in second, different language. In this way, client devices 12 may request web text from a broader range of content providers 18.

The TTS module 94 may function as a speech synthesizer and generate a speech audio signal based on the web text. The speech audio signal may be, for example, a pulse code modulated (PCM) audio signal. Other types of audio signals suitable for presenting the web text as spoken audio may be selectively employed. The TTS module 94 may, for example, process the web text, generate a signal-based representation of each word (e.g., an analog or digital signal portion), and combine the electrical representations of the words in the web text to obtain the speech audio signal. The TTS module 94 may then transmit the speech audio signal to the audio output device 20 of the client 12 for presentation of the web text as spoken audio. The TTS module 94 may perform a textual and linguistic analysis of the web text when generating the speech audio signal. The TTS module 94 may be selectively implemented as hardware, software, or a combination of hardware and software.

The client device 12 may also include a positioning module 96 for determining the location of the client device. For example, the client device 12 may be a vehicle navigation unit and include a global positioning system (GPS) unit 96 for determining the geographic location of the client device. The application 92 may receive the geographic location of the client 12 from the GPS unit 96 as position coordinates (e.g., latitude and longitude). The client device 12 may also include the geographic position provided by the GPS unit 96 as location information in the request for web text. The location information included in the request may also include, for example, one or more street names, a city, and the like. The application 92 may include the location information in the URL request for web text as one or more URL parameters. In this way, the client device 12 may receive encoded content that includes web text associated with the location information included in the request.

For example, the server module 14 may be adapted to aggregate web text relating to traffic information that is associated with one or more roads near the determined geographic location of a client. Traffic information may include, for example, traffic conditions, road conditions, traffic incidents, travel times, construction information, and the like. Further, traffic information may be related to the road on which a driver is currently traveling as well as roads connected to or in the vicinity of the currently traveled road. The client device 12, in this example, may be a vehicle navigation unit and may request information that relates to the current traffic and road conditions of the road the vehicle is currently traveling on. Accordingly, the client device 12 may include the geographic location of the vehicle in the request for web text relating to traffic information. In turn, the server module 14 may use the location information provided in the request to retrieve traffic information from the content database 76 (or from a content provider in an ad hoc fashion) that is associated with the geographic location of the client device 12. Additional or alternative types of localized information may be aggregated by the server module 14 and requested by the client device 12.

Further, the client device 12 may include a storage module (not shown) for storing the encoded content received from the server module 14. As mentioned above the server module 14 may transmit the encoded (or compressed) content to the client 12 in response to a request received from the client as well as automatically in response to a trigger. In response to the trigger, the server module 14 may push encoded content to the client 12. In this way, web text may be available at the client 12 before a client submits an explicit request for web text to the server module 14. The encoded content pushed to the client 12 may be stored in the storage module until a user selects it for presentation as spoken audio; or, the client may automatically present the web text to the user when it is received from the server module 14. The client 12 may be adapted to receive user input specifying which presentation approach to use. This alternative approach may be useful where a user at the client 12 wants to receive time-sensitive information such as, for example, frequently updated stock quotes or breaking news. In this way, the client 12 may present the user with the web text as spoken audio without the user making an explicit request for it.

Figure 11:
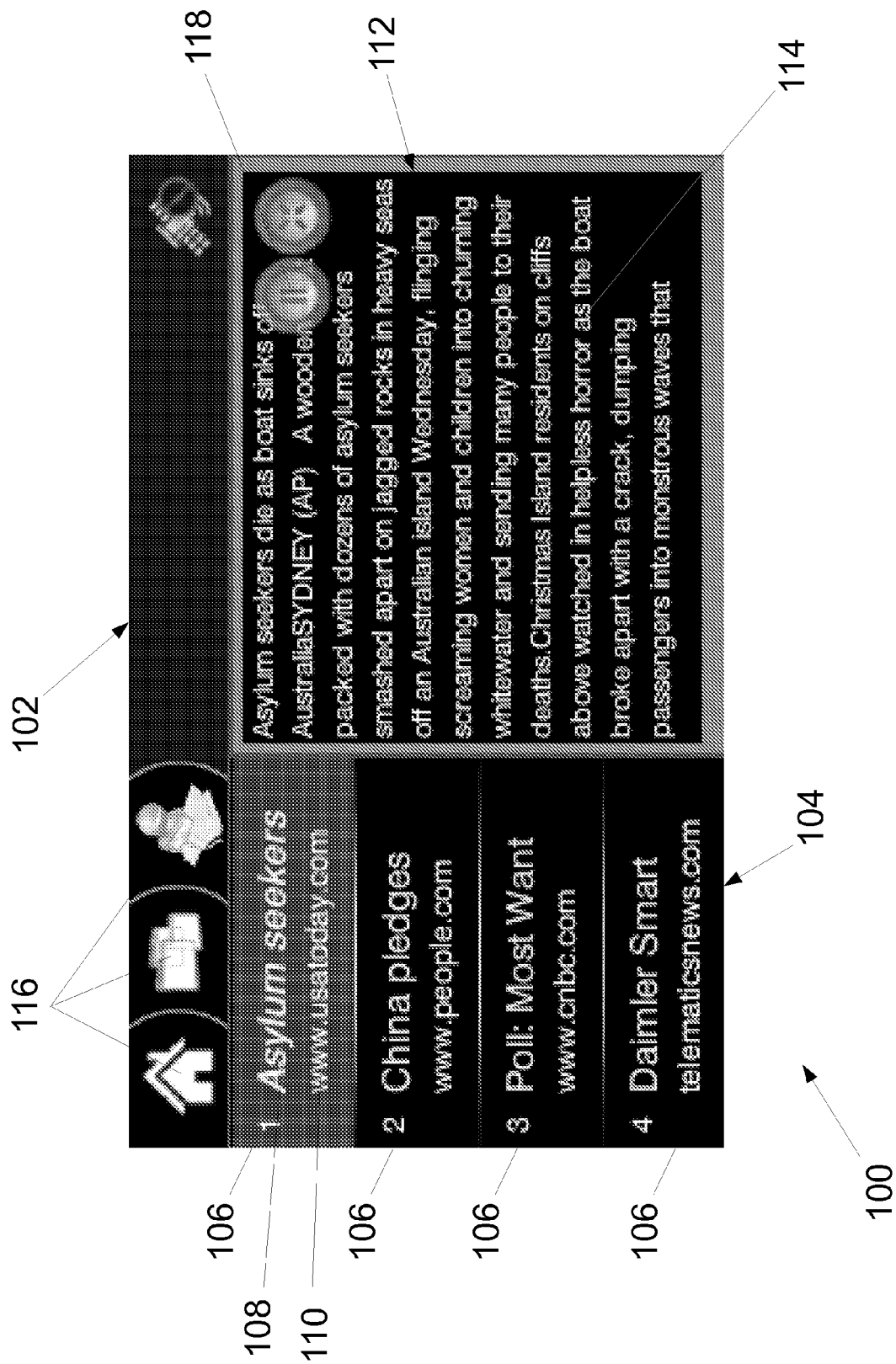
FIG. 11 is an example user interface for a client module device of the system for aggregating text-based content and presenting the text-based content as spoken audio in accordance with one example implementation of the invention.

Referring now to FIG. 11, an example user interface 100 (UI) for requesting, presenting, and selecting web text items is shown. As seen in FIG. 11, the UI 100 may include various panels for operating the UI and presenting information on the UI. In the example shown, the UI 100 includes a control panel 102 having various buttons for operating the client device 12. The UI 100 also includes an item list panel 104 for listing the web text items 106 received from the server module 14. The item list panel 104 may display the item title 108 and the source 110 (e.g., the website URL of the content provider) as shown by way of example in FIG. 11. The UI 100 may additionally include a content panel 112 for displaying at least a portion of the web text 114 of a selected web text item 106 such as a short summary.

The UI 100 may be configured to receive user input specifying a desired category. User input may be provided by, for example, pressing a button on a hard or soft keypad as well as by voice command. Upon selection of a desired category, the client device 12 may request and receive web text items from the server module 14 associated with the selected category. The UI 100 may also be configured to receive user input specifying a desired web text item for audible playback as spoken audio. The UI 10 may include input controls 116 (e.g., buttons) for operating the client device 12 and controlling playback of the spoken audio for web text items 106. The UI 100 and client device 12 may be configured to play web text items 106 in a sequential or non-sequential fashion. Upon completion of the playback of the spoken audio for a web text item 106, the client device 12 may be configured to automatically output a speech audio signal for the next web text item available or wait for further input from the user.

In the example shown, the UI 100 includes a play/pause button 118 for initiating and pausing playback of the spoken for a selected web text item 106. Additional or alternative control buttons may be included. For example, the UI 100 may include a "seek" button and a "random" button. The "seek" button allows a user at the client device to skip to subsequent web text items until an acceptable web text item is found. With the "seek" feature, the client device 12 terminates output of a current speech audio signal, selects a new web text item, generates a speech audio signal based on the web text of the selected web text item, and automatically initiates output of the new speech audio signal.

The "random" button allows a user to initiate randomized output of multiple speech audio signals in succession. The client 12 may output successive randomized speech audio signals in one category or across different categories. In this way, the random feature allows a user to listen to a broad range of content. The UI 100 may additionally include input controls (e.g., buttons, textboxes, hard and/or soft keypads, voice command, etc.) adapted to receive user input for selecting or identifying a desired content provider as mentioned above. A user at the client may use the UI 100 of the client to select or identify content providers on an ad hoc basis when requesting web text from the server module 14 and/or for storage at the server module and association with the user account.

The UI 100 may be presented on a touchscreen display 22 allowing the user to select web text items and buttons by simply touching the display screen. Other implementations for operating the client device and selecting web text items for playback may selectively be employed including, for example, keyboard, keypad, mouse, stylus, voice-controlled input, and the like. Touchscreen and voice-controlled displays may be useful when the client device is a vehicle infotainment device and operated while driving.

Figure 12:
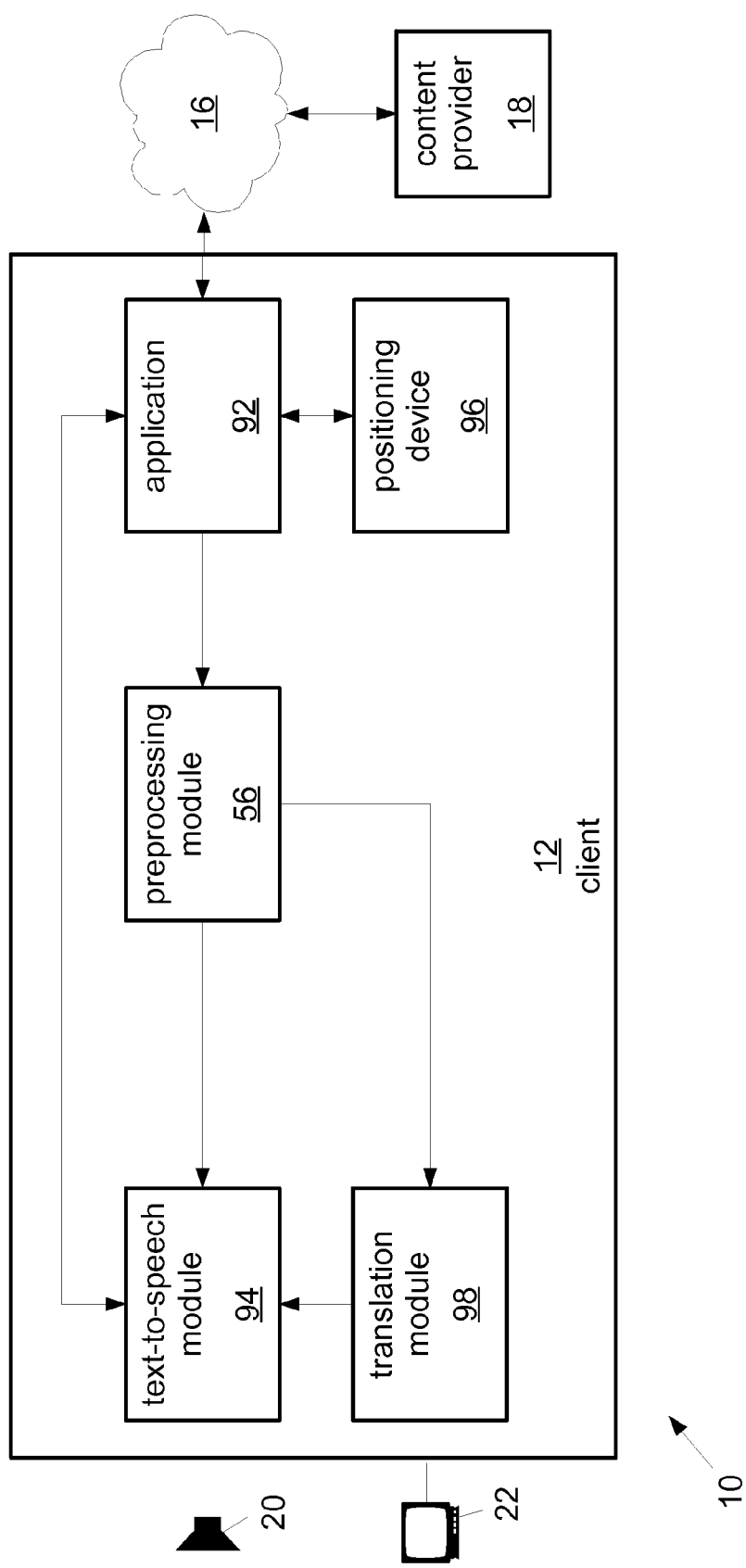
FIG. 12 is a block diagram of an example system for presenting text-based content as spoken audio in accordance with one example of an implementation of the invention.

Finally, referring to FIG. 12, a block diagram of a client 12 of another example of an implementation of a system 10 is shown. In the example system 10 of FIG. 12, the client 12 includes the modules necessary to request and receive web content from a web content provider 18 directly, process the received web content to extract the web text, and generate a speech audio signal based on the web text for presentation of the web text as spoken audio. As seen in FIG. 12, the client 12, in this example, is in signal communication with a web content provider 18 via a network 16. The client 12, in this example, also includes a web content processing module 56 configured to extract web text from web content received from the content provider 18 as discussed above. In this example, the application 92 at the client is configured to submit requests for web content (e.g., HTTP requests) to the web content provider 18 and receive web content (e.g., web page documents and web feed documents) in response. The client 12 in the example shown may also include a sub-module (not shown) for iterating through web feed documents and generating requests for web pages listed in the web feed documents as discussed above.

The application 92 may provide the web content processing module 56 with the received web content, and the web content processing module may parse and extract the web text from the web content. The preprocessing module 56, in this example, may provide the web text to the text-to-speech module 94. The TTS module 94 may generate a speech audio signal based on the web text as discussed above. The preprocessing module 56 may also provide the translation module 98 with the encoded web text for translation into different languages as discussed above, and the translation module may provided the TTS module 94 with the translated web text. The web content processing module 56 may send the web text to a storage module (not shown) at the client for storage. Subsequently, the TTS module 94 may use the stored web text to generate speech audio signals.

Further, the client 12, in this example, may only aggregate the web text of web content received from a web content provider (like the BSS 46 discussed above). In other words, the client 12 may be configured not to transmit subsequent requests for any non-text-based content such as, for example, image files, video files, script files etc. As a result, the client 12, in this example, may be configured to only request the web document (e.g., the HTML-formatted web page) and withhold requests for any image, video, or script files referenced or linked to in the web document.

It will be understood and appreciated that one or more of the processes, sub-process, and process steps described in connection with FIGS. 1-11 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIGS. 1-11. The software memory may include an ordered listing of executable instructions for implementing logical functions (that is, "logic" that may be implemented with in digital form such as digital circuitry or source code, or in analog form such as analog source such as an analog electrical, sound, or video signal). The instructions may be executed within a processing module, which includes, for example, one or more microprocessors, general purpose processors, combinations of processors, DSPs, or ASICs.

The executable instructions may be implemented as a computer program product and selectively embodied in any non-transitory computer-readable storage medium for use by or in connection with an instruction execution system, apparatus, or device, such as a computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for processing and presenting web content comprising:
   a hardware network interface configured to receive web content from one or more web content providers, the web content including text-based content;
   a processor; and
   a computer-readable storage medium storing instructions executable by the processor to:
      extract the text-based content from the web content;
      parse the web content to extract the text-based content with a web content processing module by applying a different parsing strategy for each particular content provider associated with the web content, each parsing strategy being configured to filter and extract text-based content from an associated content provider for that parsing strategy based on a web document structure unique to the associated content provider;
      select and retrieve a template document for encoding the text-based content based on one or more of a type of the text-based content and a content provider that provided the text-based content, the template document including placeholders to be replaced with respective portions of the text-based content, a configuration of the template document and the placeholders of the template document being selected based on the type of the text-based content, where different template document configurations having one or more different placeholders from other template document configurations are selectively employed to encode different types of text-based content; and
      encode the text-based content to obtain encoded content that includes the text-based content with an encoding module using the retrieved template document, the retrieved template document being configured for the text-based content to encode and format the text-based content according to an encoding schema that is adapted for the type of the text-based content, and the encoded content having a format suitable for presenting the text-based content as spoken audio,
   the system further including a content database including one or more web text tables for storing each item of the text-based content in respective rows of the web text tables, and including a category table for storing available categories of text-based content in respective rows of the category table, where each web text table of the one or more web text tables is associated with a different type of web text stored in that web text table, and each web text table includes different fields from other web text tables based on the type of web text stored in that web text table.

2. The system of claim 1 where the encoded content is transmitted to a client in response to receipt of a request for text-based content from the client where output of a speech audio signal that is generated based on the text-based content included in the encoded content presents the text-based content as spoken audio.

3. The system of claim 2 where the request for text-based content includes a URL having one or more parameters associated with the requested text-based content.

4. The system of claim 2 where:
   the request for text-based content indicates a predetermined web content provider; and
   the encoded content transmitted to the client includes text-based content associated with the predetermined web content provider.

5. The system of claim 2 where:
   the request for text-based content indicates a predetermined category; and
   the encoded content transmitted to the client includes text-based content associated with the predetermined category.

6. The system of claim 2 where:
   the request for text-based content includes location information that relates to a determined geographic location of the client; and
   the encoded content transmitted to the client includes text-based content associated with the location information.

7. The system of claim 6 where the text-based content associated with the location information includes traffic information that relates to one or more roads near the determined geographic location of the client.

8. The system of claim 1 where the encoded content is automatically transmitted to a client in response to a trigger.

9. The system of claim 8 where the trigger is an end to a periodic interval or receipt of web content from one of the web content providers.

10. The system of claim 1 where:
    the encoding module encodes the text-based content in an XML-format to obtain the encoded content as an XML-formatted document, the encoding module using an XML schema that is indicated in the template document and adapted for a type of web text requested, the template document being selected based on the type of web text requested; and
    the XML-formatted document is transmitted to a client for presentation of the text-based content as spoken audio.

11. The system of claim 1 where, for each template document of a plurality of template documents, a database indicates one or more of a type of web text and a content provider associated with that template document, and where all text-based content having a type of web text or originating from a content provider is encoded via an encoding scheme from the template document associated with that type of web text or that content provider.

12. The system of claim 10 wherein the instructions are further executable by the processor to compress the encoded content with a compression module to obtain compressed content that includes the encoded content, and wherein each parsing strategy is configured to analyze and distinguish HTML structure and HTML tags used by the associated content provider for that parsing strategy.

13. The system of claim 1 wherein the instructions are further executable by the processor to generate one or more requests for web content from the one or more web content providers with an aggregation module.

14. The system of claim 13 where the aggregation module automatically generates the one or more requests for web content at a periodic interval.

15. The system of claim 14 where:
the aggregation module receives web content from one of the web content providers in response to receipt of one of the requests for web content at the web content provider; and
the aggregation module withholds generating subsequent requests for non-text-based web content associated with the web content received from the web content provider.

16. The system of claim 13 where the aggregation module generates at least one of the requests for web content in response to receipt of a request for text-based content from a client.

17. The system of claim 13 where at least one of the requests for web content includes a request for a web page document.

18. The system of claim 13 where at least one of the requests for web content includes a request for a web feed document.

19. The system of claim 18 where:
the web feed document includes a list of one or more web page documents; and
the aggregation module iterates through the list and generates a request for at least one of the web page documents in the list.

20. The system of claim 19 where:
the web content received from one of the web content providers has a predetermined format; and
the web content processing module applies a parsing strategy based on the predetermined format to extract the text-based content from the web content.

21. The system of claim 19 where the web content processing module categorizes the text-based content.

22. The system of claim 19 further comprising a data storage module that stores the text-based content.

23. The system of claim 22 where the data storage module is one or more relational databases comprising one or more web text tables having fields depending on the type of the text-based content.

24. The system of claim 1 further comprising an account storage module that stores one or more client profiles that are respectively associated with one or more clients.

25. The system of claim 24 where the one or more client profiles respectively indicate one or more predetermined web content providers.

26. The system of claim 25 where the encoded content includes text-based content associated with at least one of the predetermined web content providers indicated in one of the client profiles.

27. The system of claim 1 where access to the system is subscription-based such that:
the system transmits the encoded content in response to receipt of a request for text-based content where the request is associated with a valid subscription; and
the system ignores the request for text-based content where the request is not associated with a valid subscription.

28. The system of claim 27 further comprising an access control module that determines whether the request for text-based content is associated with a valid subscription.

29. A device for presenting web content comprising:
a hardware network interface configured to receive encoded content, the encoded content includes text-based content extracted from web content, and the encoded content is encoded by an encoding device in a format suitable for presenting the text-based content as spoken audio using a template automatically selected by an encoding device processor of the encoding device based on one or more of a type of the text-based content and a content provider for the text-based content, the template including placeholders to be replaced with respective portions of the text-based content, a configuration of the template and the placeholders in the template being selected based on the type of the text-based content and selectively employed to generate the encoded content;
a display configured to display a user interface for requesting, presenting, and selecting web text items;
an audio output device configured to output speech audio;
a processor; and
a computer-readable storage medium storing instructions executable by the processor to:
decode the encoded content with a decoding module to access the text-based content, the text-based content being accessed, via the hardware network interface, from a content database including one or more web text tables for storing each item of the text-based content in respective rows of the web text tables, the content database including a category table for storing available categories of text-based content in respective rows of the category table, where each web text table of the one or more web text tables is associated with a different type of web text stored in that web text table, and each web text table includes different fields from other web text tables based on the type of web text stored in that web text table;
display the user interface including a plurality of panels, the plurality of panels including an item list panel for displaying one or more web text items of the text-based content, and a content panel for displaying at least a portion of a selected web text item of the text-based content;
generate a speech audio signal based on the text-based content with a text-to-speech module responsive to receiving input to the user interface requesting a first web text item to be output as spoken audio; and
output the speech audio signal via the audio output device to present the first web text item as spoken audio.

30. The device of claim 29 where the encoded content includes text-based content that is in a first natural language, the instructions further executable by the processor to:
translate the text-based content in the first natural language into translated text-based content in a second natural language that is different from the first natural language with a translation module.

31. The device of claim 29 where the device transmits a request for text-based content to a server and receives the encoded content in response to receipt of the request at the server.

32. The device of claim 31 where the request for the text-based content includes a URL having one or more parameters associated with the requested text-based content.

33. The device of claim 31 where:
the request for the text-based content indicates a predetermined content provider; and
the encoded content received in response to the request includes text-based content associated with the predetermined content provider.

34. The device of claim 31 where:
the request for the text-based content indicates a predetermined category; and the encoded content received in response to the request includes text-based content associated with the predetermined category.

35. The device of claim 31 where:
the device is in signal communication with a positioning module that determines a geographic location of the device;
the request for the text-based content includes location information that relates to the determined geographic location of the device; and
the encoded content received in response to the request includes text-based content associated with the location information.

36. The device of claim 35 where the text-based content associated with the location information includes traffic information that relates to one or more roads near the determined geographic location of the device.

37. The device of claim 29 where the encoded content is an XML-formatted document.

38. The device of claim 29 where the device receives compressed content that includes the encoded content and the instructions are further executable by the processor to:
decompress the compressed content with a decompression module to access the encoded content.

39. The device of claim 29 where the speech audio signal is a pulse code modulated signal.

40. The device of claim 29 where the audio output device receives the speech audio signal and outputs the speech audio signal such that the text-based content is presented as spoken audio.

41. The device of claim 40 where the speech audio signal is output at the audio output device in response to receipt of user input at the device.

42. The device of claim 41 where, in response to the user input at the device:
output of a first speech audio signal associated with first text-based content is terminated; and
output of a second speech audio signal associated with second text-based content is automatically initiated.

43. The device of claim 40 where the speech audio signal is automatically output at the audio output device in response to receipt of the encoded content at the device.

44. The device of claim 40 where a plurality of speech audio signals respectively associated with a plurality of text-based content associated with a plurality of different web text categories is randomly output in succession at the audio output device responsive to receiving user input selecting a "random" user interface button.

45. The device of claim 29 where the device is installed in a vehicle.

46. The device of claim 45 where the device is in signal communication with a vehicle audio system and the speech audio signal is output at the vehicle audio system.

47. The device of claim 29 where the encoded content includes text-based content associated with one or more predetermined web content providers that are indicated in a profile associated with the device.

48. The device of claim 29 where receipt of the encoded content is subscription-based such that the device receives the encoded content in response to receipt at a server of a request for text-based content that is associated with a valid subscription.

49. The device of claim 48 where the request for text-based content includes access credentials that indicate the request is associated with a valid subscription.

50. A system for processing and presenting web content comprising:
a server module that includes a first processor and a first computer-readable storage medium, the first computer-readable storage medium storing first instructions executable by the first processor to receive web content from one or more web content providers, the web content including text-based content, and the first instructions further executable by the first processor to provide:
an aggregation module that generates one or more requests for web content from the one or more web content providers; and
a web content processing module that parses the web content received at the server module to extract the text-based content;
the server module further including a content database including one or more web text tables for storing each item of the text-based content in respective rows of the web text tables, and including a category table for storing available categories of text-based content in respective rows of the category table, where each web text table of the one or more web text tables is associated with a different type of web text stored in that web text table, and each web text table includes different fields from other web text tables based on the type of web text stored in that web text table;
an encoding module that encodes the text-based content in a markup language to obtain encoded content as a document formatted in the markup language, the document including the text-based content based on a template document retrieved from a database storing a plurality of template documents, the template document including placeholders to be replaced with respective portions of the text-based content, a configuration of the template document and the placeholders of the template document being selected based on a type of the text-based content, the encoding module using a schema for the markup language that is adapted for a type of web text requested, and the encoded content having a format suitable for presenting the text-based content as spoken audio; and
a client module in signal communication with the server module that includes a second processor and a second computer-readable storage medium, the second computer-readable storage medium storing second instructions executable by the second processor to receive the encoded content from the server module, the second instructions further executable by the second processor to provide:
a decoding module that decodes the encoded content to access the text-based content;
a translation module that receives the text-based content from the decoding module and translates the text-based content from a first language to a second language, the first language being different from the second language, and the first language being a language in which the client module provided a request for the text-based content; and
a text-to-speech module that receives the text-based content from the translation module and generates a speech audio signal based on the text-based content such that output of the speech audio signal presents the web text as spoken audio in the second language.

* * * * *